United States Patent
Enomoto et al.

(10) Patent No.: US 10,930,954 B2
(45) Date of Patent: Feb. 23, 2021

(54) INSPECTION METHOD OF FUEL CELL AND INSPECTION SYSTEM THEREOF

(71) Applicant: TOYOTA JIDOSHA KABUSHIKI KAISHA, Toyota (JP)

(72) Inventors: Kei Enomoto, Nissin (JP); Toshiyuki Tonuma, Nissin (JP); Shinya Sano, Okazaki (JP); Kento Ida, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 16/256,176

(22) Filed: Jan. 24, 2019

(65) Prior Publication Data

US 2019/0252703 A1   Aug. 15, 2019

(30) Foreign Application Priority Data

Feb. 13, 2018   (JP) .............................. JP2018-022906

(51) Int. Cl.
| | | |
|---|---|---|
| *H01M 8/04664* | (2016.01) | |
| *G01B 13/24* | (2006.01) | |
| *H01M 8/0438* | (2016.01) | |

(52) U.S. Cl.
CPC ........ *H01M 8/04679* (2013.01); *G01B 13/24* (2013.01); *H01M 8/0438* (2013.01)

(58) Field of Classification Search
CPC ............. H01M 8/0258; H01M 8/0267; H01M 8/04029

See application file for complete search history.

(56) References Cited

U.S. PATENT DOCUMENTS

| | | | | |
|---|---|---|---|---|
| 8,278,002 | B2* | 10/2012 | Sugawara ............. | H01M 8/242 429/481 |
| 8,838,342 | B2* | 9/2014 | Murata ............... | B60R 21/0132 701/45 |
| 10,079,397 | B2* | 9/2018 | Imanishi ........... | H01M 8/04664 |
| 10,601,057 | B2* | 3/2020 | Itoga ..................... | B60L 3/0053 |
| 10,638,674 | B2* | 5/2020 | Mueller ................... | B09C 1/02 |
| 2003/0077495 | A1* | 4/2003 | Scartozzi .......... | H01M 8/04089 429/429 |

(Continued)

FOREIGN PATENT DOCUMENTS

| | | | | |
|---|---|---|---|---|
| JP | 62264567 | A | * 11/1987 | .............. H01M 8/04 |
| JP | 2007-089093 | A |   3/2007 | |

(Continued)

*Primary Examiner* — David A. Rogers

(74) *Attorney, Agent, or Firm* — Dickinson Wright PLLC

(57) ABSTRACT

In an inspection method for inspecting occurrence of a deformation in a fuel cell, a change amount between a pressure loss parameter value before an impact and a pressure loss parameter value after the impact is found, and when the change amount is a reference value determined in advance or more, it is determined that the deformation occurs inside the fuel cell. It is determined that the deformation occurs inside the fuel cell due to the impact, in at least either of a case where the change amount of a first pressure loss parameter value that is a pressure loss parameter value in a gas passage is a first reference value or more and a case where the change amount of a second pressure loss parameter value that is a pressure loss parameter value in a refrigerant passage is a second reference value or more.

7 Claims, 9 Drawing Sheets

(56) References Cited

U.S. PATENT DOCUMENTS

| | | | |
|---|---|---|---|
| 2006/0019137 A1* | 1/2006 | Fukuda | H01M 8/04029 429/437 |
| 2010/0084035 A1* | 4/2010 | Binet | F16L 11/083 138/104 |
| 2010/0191425 A1* | 7/2010 | Murata | B60R 21/0132 701/45 |
| 2011/0053099 A1* | 3/2011 | Boing | F23D 14/12 431/2 |
| 2016/0064766 A1 | 3/2016 | Hashimoto et al. | |
| 2016/0141689 A1* | 5/2016 | Okamoto | H01M 8/04873 429/432 |
| 2016/0211543 A1* | 7/2016 | Okabe | H01M 8/0273 |
| 2016/0226082 A1* | 8/2016 | Konno | H01M 8/0258 |
| 2016/0248105 A1* | 8/2016 | Sato | H01M 8/1004 |
| 2016/0329593 A1* | 11/2016 | Kubo | H01M 8/242 |
| 2016/0344043 A1* | 11/2016 | Ichioka | H01M 8/0271 |
| 2016/0380277 A1* | 12/2016 | Okabe | H01M 8/0254 429/434 |
| 2016/0380286 A1* | 12/2016 | Yamanaka | H01M 8/04664 320/103 |
| 2017/0069920 A1* | 3/2017 | Sakakibara | H01M 8/04358 |
| 2017/0069922 A1* | 3/2017 | Yamanaka | H01M 8/04097 |
| 2017/0096172 A1 | 4/2017 | Nagaosa | |
| 2017/0141417 A1* | 5/2017 | Lucas | H01M 8/04141 |
| 2017/0256806 A1* | 9/2017 | Ogawa | H01M 8/04798 |
| 2018/0123148 A1* | 5/2018 | Itoga | B60L 50/72 |
| 2018/0198139 A1* | 7/2018 | Ikoma | H01M 8/04029 |
| 2018/0323452 A1* | 11/2018 | Smith | H01M 8/0267 |

FOREIGN PATENT DOCUMENTS

| | | |
|---|---|---|
| JP | 2009-266537 A | 11/2009 |
| JP | 2015-231319 A | 12/2015 |
| JP | 2016-051563 A | 4/2016 |

\* cited by examiner

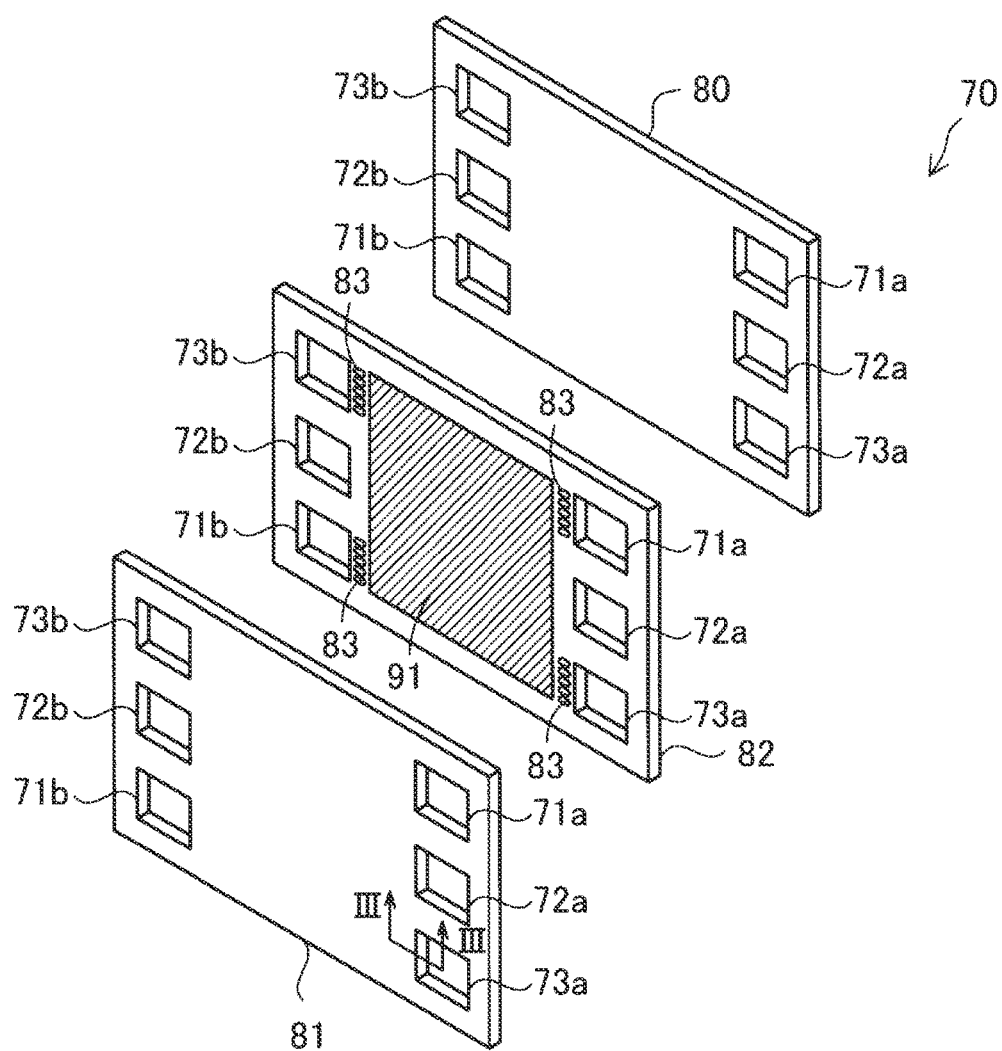
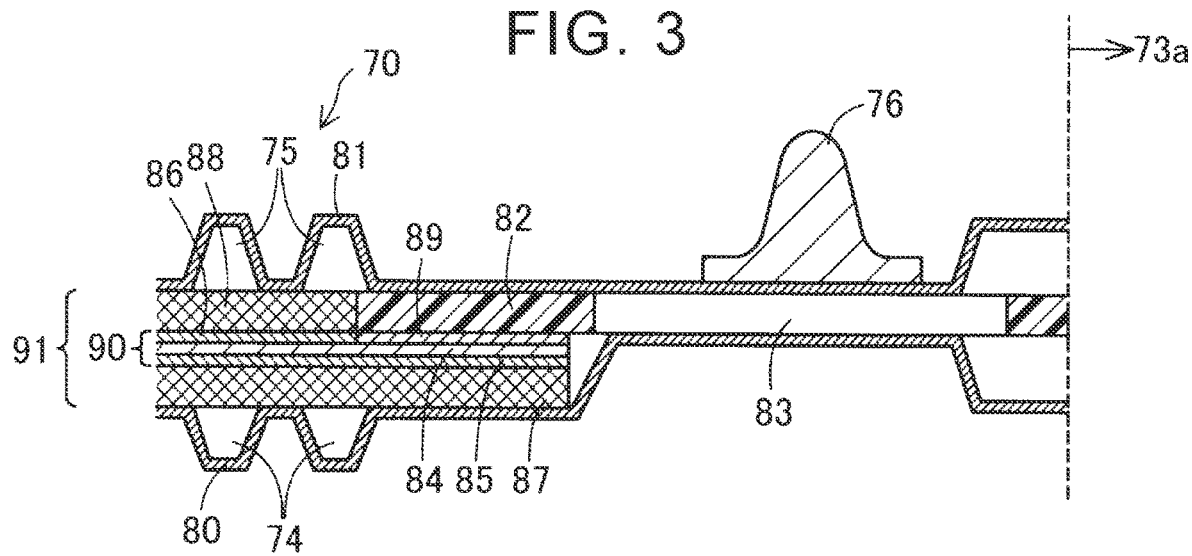

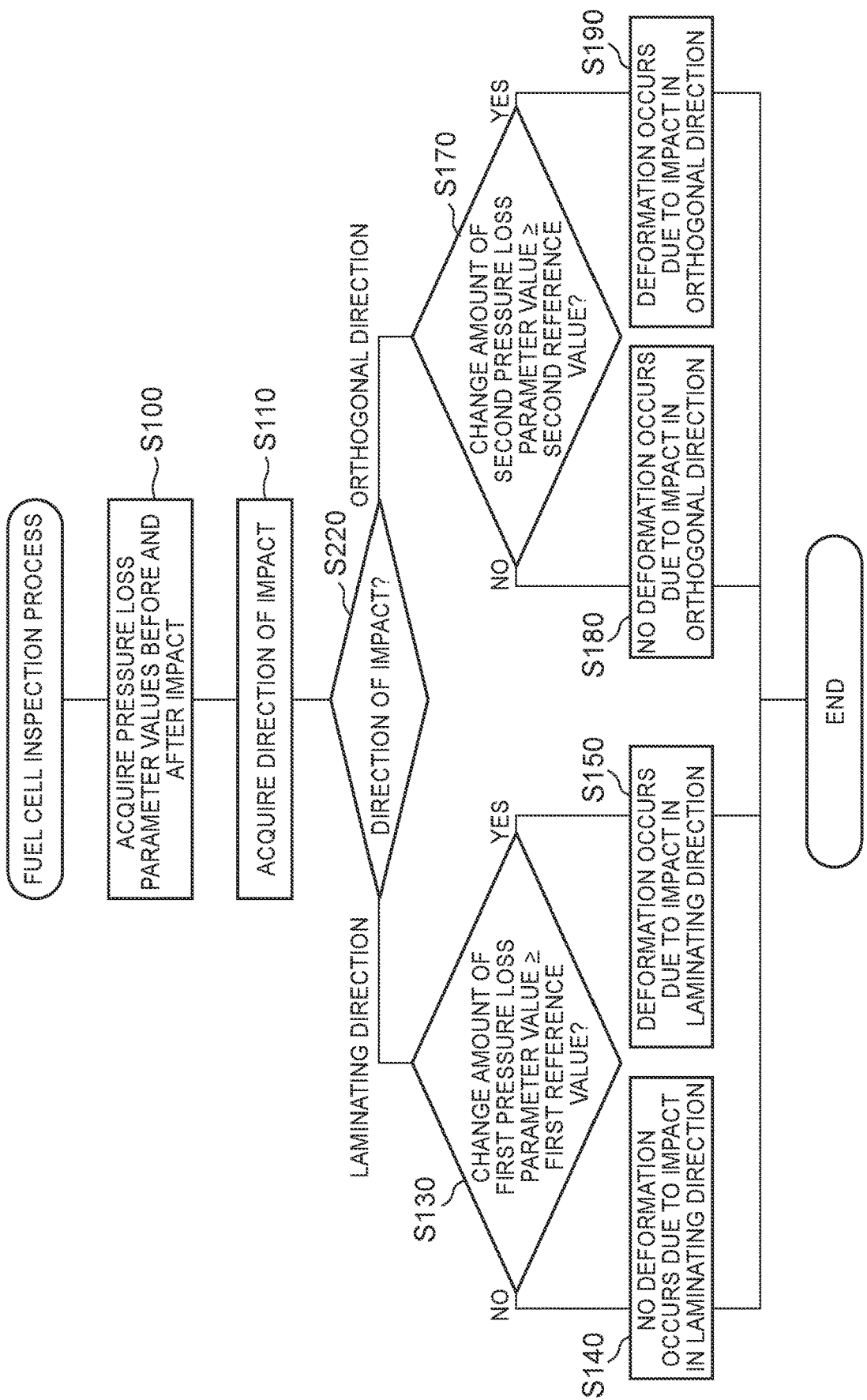

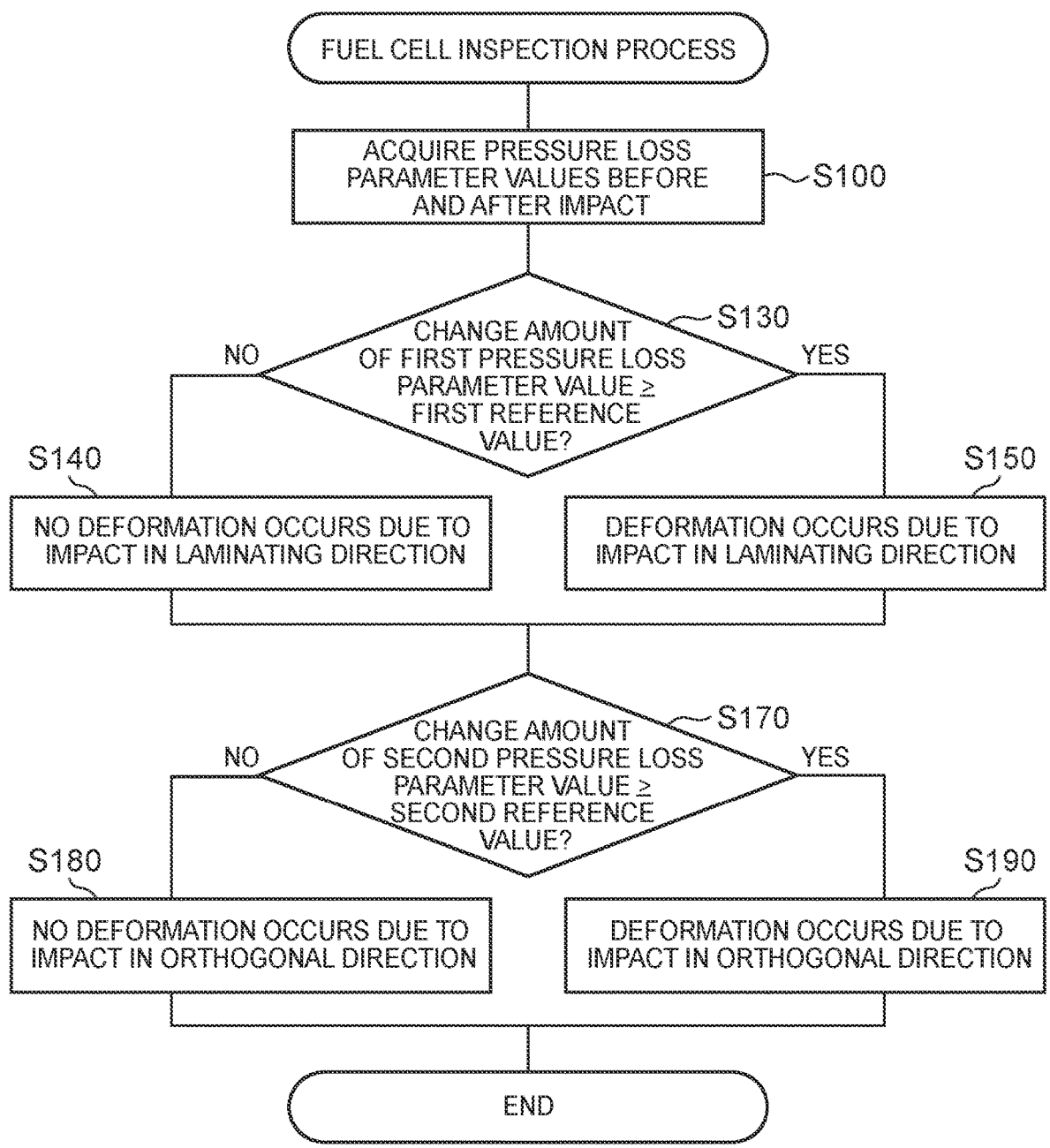

INSPECTION METHOD OF FUEL CELL AND INSPECTION SYSTEM THEREOF

INCORPORATION BY REFERENCE

The disclosure of Japanese Patent Application No. 2018-022906 filed on Feb. 13, 2018 including the specification, drawings and abstract is incorporated herein by reference in its entirety.

BACKGROUND

1. Technical Field

The disclosure relates to an inspection method of a fuel cell and an inspection system thereof.

2. Description of Related Art

When an impact is applied to a fuel cell, the fuel cell deforms, so that a decrease in power generation performance and the like may occur. As a method for detecting a deformation and the like of a fuel cell, caused due to an impact, there has been conventionally proposed a method for inspecting occurrence of a lamination deviation in such a manner that a mark extending in a laminating direction is provided on a side face of a fuel cell stack, a slit is provided in a stack case in which the fuel cell stack is accommodated, and a shape of the mark is visually observed from outside through the slit (e.g., see Japanese Unexamined Patent Application Publication No. 2009-266537 (JP 2009-266537 A)).

SUMMARY

However, various devices and the like including pipes for supply/discharge of a reactant gas and a refrigerant with respect to the fuel cell are generally placed around the fuel cell. This accordingly makes it difficult to visually observe the mark provided on the fuel cell stack inside the stack case from outside the stack case without removing the devices and the like including the pipes. On this account, a technique to more easily detect a deformation of the fuel cell, caused due to an impact, has been desired.

(1) A first aspect of the present disclosure relates to an inspection method for inspecting occurrence of a deformation in a fuel cell formed by laminating a plurality of single cells and including a gas passage through which a reactant gas flows and a refrigerant passage through which a refrigerant flows. The gas passage and the refrigerant passage are each provided inside the fuel cell as a fluid passage through which a fluid flows in parallel to a lamination plane of the fuel cell. The inspection method includes: acquiring a pressure loss parameter value before an impact is applied to the fuel cell and a pressure loss parameter value after the impact is applied to the fuel cell, as a pressure loss parameter value correlated with a pressure loss in the fluid passage provided inside the fuel cell, the pressure loss parameter value being obtained when the fluid at a flow rate determined in advance is introduced into the fluid passage; finding a change amount between the acquired pressure loss parameter value before the impact and the acquired pressure loss parameter value after the impact; and determining that the deformation has occurred inside the fuel cell, when the change amount indicative of an increase of the pressure loss is a reference value determined in advance or more. It is determined that the deformation has occurred inside the fuel cell due to the impact, in at least either of the following cases: a case where the change amount of a first pressure loss parameter value that is a pressure loss parameter value in the gas passage is a first reference value or more; and a case where the change amount of a second pressure loss parameter value that is a pressure loss parameter value in the refrigerant passage is a second reference value or more. In the inspection method of this aspect, a deformation inside the fuel cell due to an impact is determined based on the change amount from the pressure loss parameter value before the impact is applied to the fuel cell to the pressure loss parameter value after the impact is applied to the fuel cell. On this account, by a simple and easy method in which the change amount of the pressure loss parameter value is found by introducing a fluid into a fluid passage inside the fuel cell and the change amount is compared with the reference value, it is possible to determine that a deformation occurs inside the fuel cell due to the impact. Further, since the determination is performed by use of the first pressure loss parameter value in the gas passage and the second pressure loss parameter value in the refrigerant passage, it is possible to perform a determination on a deformation that has occurred due to an impact in a laminating direction of the single cells and a determination on a deformation that has occurred due to an impact in an orthogonal direction that is orthogonal to the laminating direction.

(2) When the change amount of the first pressure loss parameter value is the first reference value or more, it may be determined that the deformation has occurred due to an impact in a laminating direction of the single cells. When the change amount of the second pressure loss parameter value is the second reference value or more, it may be determined that the deformation has occurred inside the fuel cell due to an impact in an orthogonal direction that is orthogonal to the laminating direction. With such a configuration, it is possible to appropriately determine whether a deformation occurs in the fuel cell or not.

(3) The inspection method may further include acquiring a direction of the impact after the impact is applied to the fuel cell. In a case where the direction of the impact is the laminating direction, it may be determined whether or not the change amount of the first pressure loss parameter value is the first reference value or more. In a case where the direction of the impact is the orthogonal direction, it may be determined whether or not the change amount of the second pressure loss parameter value is the second reference value or more. With such a configuration, it is possible to appropriately determine whether a deformation occurs in the fuel cell or not, in accordance with the direction of the impact.

(4) When the change amount of the first pressure loss parameter value is the first reference value or more, it may be determined that the deformation has occurred due to an impact in a laminating direction of the single cells. When the change amount of the second pressure loss parameter value is the second reference value or more, it may be determined that the deformation has occurred due to an impact in an orthogonal direction orthogonal to the laminating direction. With such a configuration, even if the direction of the impact is not acquired in advance, it is possible to determine whether or not a deformation occurs in the fuel cell due to the impact and to find the direction of the impact.

(5) A fuel gas supply device configured to adjust a flow rate of a fuel gas to be supplied to the fuel cell and including an injector and a fuel gas pump may be connected to the fuel cell. The injector is configured to discharge the fuel gas into a fuel gas supply passage through which the fuel gas is supplied to the fuel cell and to adjust an amount of the fuel gas to be supplied to the fuel gas supply passage based on a valve-opening duty ratio of the injector. The fuel gas pump is provided in a circulation passage through which a fuel exhaust gas discharged from the fuel cell is recirculated to the fuel gas supply passage. The first pressure loss parameter value may include at least any one of the following values: a value of an electric power used by the fuel gas pump when the flow rate of the fuel gas in a fuel-gas passage formed in the fuel cell becomes a first flow rate determined in advance at a time when driving amounts of devices included in the fuel gas supply device, except the fuel gas pump, are constant; a value of the valve-opening duty ratio of the injector when the flow rate of the fuel gas in the fuel-gas passage formed in the fuel cell becomes a second flow rate determined in advance at a time when driving amounts of devices included in the fuel gas supply device, except the injector, are constant; and a value of the flow rate of the fuel gas actually flowing through the fuel-gas passage formed in the fuel cell when the fuel gas supply device including the fuel gas pump and the injector is driven at a command value determined in advance so that the flow rate of the fuel gas in the fuel-gas passage becomes a third flow rate determined in advance. With the inspection method of the aspect, it is possible to detect the deformation of the fuel cell due to the impact in the laminating direction by use of at least any one of the value of the electric power used by the fuel gas pump, the value of the valve-opening duty ratio in the injector, and the value of the flow rate of the fuel gas actually flowing through the fuel-gas passage when the fuel gas supply device is driven at the command value.

(6) An oxidation gas supply device configured to adjust a flow rate of an oxidation gas to be supplied to the fuel cell and including a compressor and a control valve may be connected to the fuel cell. The compressor is configured to discharge the oxidation gas into an oxidation gas supply passage through which the oxidation gas is supplied to the fuel cell. The control valve is configured to adjust a flow passage area of an oxidation gas discharge passage through which an oxidation exhaust gas discharged from the fuel cell flows. The first pressure loss parameter value may include at least any one of the following values: a value of an electric power used by the compressor when the flow rate of the oxidation gas in an oxidation-gas passage formed in the fuel cell becomes a fourth flow rate determined in advance at a time when driving amounts of devices included in the oxidation gas supply device, except the compressor, are constant; a value of an opening degree of the control valve when the flow rate of the oxidation gas in the oxidation-gas passage formed in the fuel cell becomes a fifth flow rate determined in advance at a time when driving amounts of devices included in the oxidation gas supply device, except the control valve, are constant; and a value of the flow rate of the oxidation gas actually flowing through the oxidation-gas passage formed in the fuel cell when the oxidation gas supply device including the compressor and the control valve is driven at a command value determined in advance so that the flow rate of the oxidation gas in the oxidation-gas passage becomes a sixth flow rate determined in advance. With the inspection method of the aspect, it is possible to detect the deformation of the fuel cell due to the impact in the laminating direction by use of at least any one of the value of the electric power used by the compressor, the value of the opening degree of the control valve, and the value of the flow rate of the oxidation gas actually flowing through the oxidation-gas passage when the oxidation gas supply device is driven at the command value.

(7) A refrigerant supply device configured to adjust a flow rate of a refrigerant to be supplied to the refrigerant passage formed in the fuel cell and including a refrigerant pump may be connected to the fuel cell. The refrigerant pump is configured to generate a driving force to cause the refrigerant to flow through the refrigerant passage. The second pressure loss parameter value may include at least either one of the following values: a value of an electric power used by the refrigerant pump when the flow rate of the refrigerant in the refrigerant passage formed in the fuel cell becomes a seventh flow rate determined in advance at a time when driving amounts of devices included in the refrigerant supply device, except the refrigerant pump, are constant; and a value of the flow rate of the refrigerant actually flowing through the refrigerant passage formed in the fuel cell when the refrigerant supply device including the refrigerant pump is driven at a command value determined in advance so that the flow rate of the refrigerant in the refrigerant passage becomes an eighth flow rate determined in advance. With the inspection method of the aspect, it is possible to detect the deformation of the fuel cell due to the impact in the orthogonal direction by use of at least either one of the value of the electric power used by the refrigerant pump and the value of the flow rate of the refrigerant actually flowing through the refrigerant passage when the refrigerant supply device is driven at the command value.

The disclosure is achievable in various forms other than the above aspects. For example, the disclosure is achievable in the form of an inspection system for inspecting occurrence of a deformation of a fuel cell due to an impact, as described below.

(8) A second aspect of the present disclosure relates to an inspection system for inspecting occurrence of a deformation in a fuel cell formed by laminating a plurality of single cells and including a gas passage through which a reactant gas flows and a refrigerant passage through which a refrigerant flows. The gas passage and the refrigerant passage are each provided inside the fuel cell as a fluid passage through which a fluid flows in parallel to a lamination plane. The inspection system includes a storage portion, a detecting portion, a derivation portion, and a determination portion. The storage portion is configured to store a pressure loss parameter value before an impact is applied to the fuel cell, as a pressure loss parameter value correlated with a pressure loss in the fluid passage provided inside the fuel cell, the pressure loss parameter value being obtained when the fluid at a flow rate determined in advance is introduced into the fluid passage. The detecting portion is configured to detect, after the impact is applied to the fuel cell, the pressure loss parameter value obtained when the fluid at the flow rate determined in advance is introduced into the fluid passage. The derivation portion is configured to derive a change amount between the pressure loss parameter value before the impact, stored in the storage portion, and the pressure loss parameter value after the impact, detected by the detecting portion. The determination portion is configured to determine that the deformation has occurred inside the fuel cell, when the change amount indicative of an increase of the pressure loss is a reference value determined in advance or more. The determination portion is configured to determine that the deformation has occurred inside the fuel cell, in at least either of the following cases: a case where the change amount of a first pressure loss parameter value that is a pressure loss parameter value in the gas passage is a first reference value or more; and a case where the change amount of a second pressure loss parameter value that is a pressure loss parameter value in the refrigerant passage is a second reference value or more.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is an exploded perspective view illustrating the outline of a configuration of a single cell;

FIG. 3 is a sectional schematic view illustrating a state of a section taken along a line in FIG. 2;

FIG. 9 is a flowchart illustrating a fuel cell inspection process routine;

FIG. 11 is a flowchart illustrating a fuel cell inspection process routine.

DETAILED DESCRIPTION OF EMBODIMENTS

Figure 1:
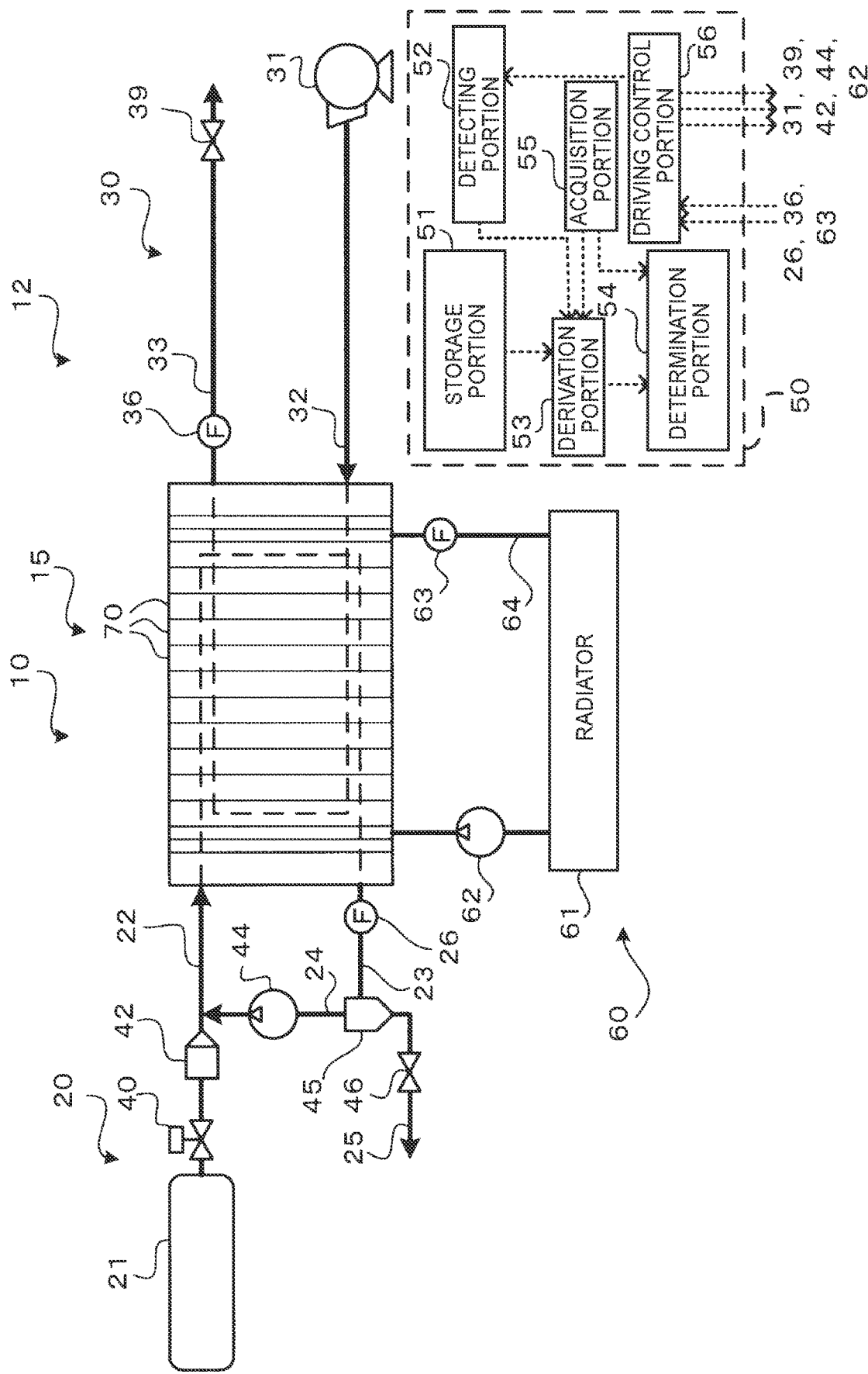
FIG. 1 is an explanatory view illustrating a schematic configuration of a fuel cell system.

A. First Embodiment (A-1) Configuration of Fuel Cell System:

FIG. 1 is an explanatory view illustrating a schematic configuration of a fuel cell system 10 as the first embodiment of the disclosure. The fuel cell system 10 of the present embodiment is provided in an electric vehicle so as to be used as a drive power supply. The fuel cell system 10 of the present embodiment includes a fuel cell 15, a fuel gas system 20, an oxidation gas system 30, a refrigerant system 60, and a controlling portion 50.

The fuel cell 15 is a solid polymer fuel cell but can be other types of fuel cells such as a solid oxide fuel cell. The fuel cell 15 has a stack structure in which a plurality of single cells 70 each as a power generation body is stacked and is configured to generate electric power by receiving supply of a fuel gas containing hydrogen and an oxidation gas containing oxygen.

FIG. 2 is an exploded perspective view illustrating the outline of a configuration of the single cell 70. Further, FIG. 3 is a sectional schematic view illustrating a state of a section along a line in FIG. 2. In the following description, the configuration of the single cell 70 will be described based on FIGS. 2 and 3. The single cell 70 includes a pair of gas separators 80, 81, a membrane electrode gas diffusion layer assembly (MEGA) 91 placed between the gas separators 80, 81, and a resin frame 82 provided between the gas separators 80, 81 and placed outside the MEGA 91 so as to make contact with the outer periphery of the MEGA 91.

As illustrated in FIG. 3, the MEGA 91 includes an electrolyte layer 84, an anode 85, and a cathode 86. A structure in which the anode 85, the electrolyte layer 84, and the cathode 86 are laminated in this order is also referred to as a membrane electrode assembly (MEA) 90. In the MEGA 91, a gas diffusion layer 87 is further placed on the anode 85, and a gas diffusion layer 88 is further placed on the cathode 86. The electrolyte layer 84 is a proton conducting ion-exchange membrane made of a polymer electrolyte material, e.g., fluorinated resin, and exhibits a good proton conductivity in a wet condition. The anode 85 and the cathode 86 are formed, for example, such that conductive particles carrying a catalyst such as platinum or platinum alloy, e.g., carbon particles, are coated with a polymer electrolyte having proton conductivity. The gas diffusion layers 87, 88 are each constituted by a member having gas permeability and electronic conductivity and can be made of a metal member such as foam metal or metal mesh or a carbon member such as carbon cloth or carbon paper, for example.

The gas separators 80, 81 are each made of a gas-impermeable conductive member, e.g., a carbon member such as dense carbon obtained by compressing carbon so as to achieve gas impermeability or a metal member such as stainless steel obtained by press molding. As illustrated in FIG. 3, the gas separators 80, 81 have an irregular shape so as to form passages through which the reactant gas for electrochemical reaction flows. An inside-cell fuel gas passage 74 through which a fuel gas containing hydrogen flows is formed between the gas separator 80 and the MEA 90, and an inside-cell oxidation gas passage 75 through which an oxidation gas containing oxygen flows is formed between the gas separator 81 and the MEA 90. The inside-cell fuel gas passage 74 and the inside-cell oxidation gas passage 75 are fluid passages through which a fluid flows in parallel to a lamination plane of the single cells 70 (also just referred to as the lamination plane). Note that, in FIG. 2, the irregular shapes of the gas separators 80, 81 are omitted. The fuel gas and the oxidation gas also just referred to as a reactant gas.

The resin frame 82 is molded in a frame shape by use of thermoplastic resin and an opening in the center of the resin frame 82 is a retainer region for the MEGA 91. As illustrated in FIG. 2, the resin frame 82 is provided with a plurality of slit portions 83, but the slit portions 83 will be described later more specifically. As illustrated in FIG. 3, in the MEGA 91, an exposed region that is not covered with the cathode 86 and the gas diffusion layer 88 is formed in a peripheral portion of the electrolyte layer 84, and the electrolyte layer 84 is joined to the resin frame 82 via an adhesive layer 89 in the exposed region. Note that, in the present embodiment, the resin frame 82 is bonded to the gas separators 80, 81 by use of an adhesive and the like. Here, that two laminated members are bonded to each other indicates that an adhesive layer having an adhesive is provided between the two members or at least one of the members (the resin frame 82 in the present embodiment) includes an adhesive, so that a chemical bond (a covalent bond or a hydrogen bond) is formed on a lamination plane between the two members and the two members are hereby firmly fixed to each other.

The gas separators 80, 81 and the resin frame 82 are provided with manifold holes 71a to 73a and 71b to 73b for forming manifolds such that the manifold holes 71a to 73a and 71b to 73b are placed near respective outer peripheries of the gas separators 80, 81 and the resin frame 82, at positions overlapping with each other in a laminating direction of the single cells 70. The manifolds are passages penetrating through the gas separators 80, 81 and the resin frame 82 so that the reactant gas or a refrigerant flows therethrough. The manifold holes 71$a$, 71$b$ and the inside-cell oxidation gas passage 75 form passages for supplying and discharging the oxidation gas. The manifold holes 73$a$, 73$b$ and the inside-cell fuel gas passage 74 form passages for supplying and discharging the fuel gas. Further, the manifold holes 72$a$, 72$b$ and a refrigerant passage 77 (refer to FIG. 8A) formed between the single cells 70 form passages for supplying and discharging a refrigerant. The refrigerant passage 77 is also referred as an inter-cell refrigerant passage 77.

In the vicinity of the manifold holes 71$a$, 71$b$, 73$a$, 73$b$, the resin frame 82 is provided with the slit portions 83 each including a plurality of elongated slits extending toward the outer periphery of the MEGA 91 from a corresponding manifold hole. The slits constituting the slit portions 83 penetrate through the resin frame 82. When the resin frame 82 is sandwiched between the gas separators 80, 81, one ends of the slits overlap with (communicate with) their neighboring manifolds in the laminating direction. Each of the slit portions 83 allows its neighboring manifold to communicate with a corresponding one of the inside-cell gas passages 74, 75. Note that each of the manifolds may communicate with its corresponding inside-cell gas passage 74, 75 via a structure provided in the resin frame 82, other than the slit portion 83.

A gasket 76 is bonded to a back surface of the gas separator 81 on the opposite side from a surface making contact with the MEGA 91. At the time when the fuel cell 15 is assembled, the single cells 70 as illustrated in FIG. 3 are laminated, and the whole single cells 70 are fixed while a fastening load is applied thereto in the laminating direction. In the fuel cell 15 configured as such, the refrigerant passage 77 is formed between adjacent single cells 70, as described above. The gasket 76 seals the refrigerant passage 77 by making contact with the gas separator 80 of its adjacent single cell 70.

Referring back to FIG. 1, the fuel gas system 20 includes a hydrogen tank 21, a fuel gas supply passage 22, a fuel gas discharge passage 23, a fuel gas circulation passage 24, an adjustable pressure regulating valve 40, an injector 42, a gas/liquid separator 45, a fuel gas pump 44, and a flow meter 26. In the present embodiment, a fuel gas supply device for adjusting the flow rate of the fuel gas to be supplied to the fuel cell 15 includes the fuel gas pump 44 and the injector 42. The hydrogen tank 21 is a storing device in which a hydrogen gas as the fuel gas is stored. The hydrogen gas stored in the hydrogen tank 21 is depressurized by the adjustable pressure regulating valve 40 and is supplied to the fuel gas supply passage 22 connected to the inside-cell fuel gas passage 74 of the fuel cell 15 via the injector 42. An amount of the fuel gas to be supplied to the fuel gas supply passage 22 can be adjusted by a value of a valve-opening duty ratio of the injector 42. As a result, a flow rate of the fuel gas flowing through the fuel cell 15 can be changed.

The fuel gas discharge passage 23 is a passage through which a fuel exhaust gas is discharged from the fuel cell 15. The fuel gas circulation passage 24 is connected to the fuel gas discharge passage 23 and a part of the fuel gas supply passage 22 on the downstream side from the injector 42, and the fuel gas circulation passage 24 recirculates the fuel exhaust gas to the fuel gas supply passage 22. That is, the fuel exhaust gas discharged from the fuel cell 15 to the fuel gas discharge passage 23 is led to the fuel gas supply passage 22 again via the fuel gas circulation passage 24. On this account, in the fuel cell system 10, while hydrogen in the fuel gas is used by power generation, the fuel gas circulates through the fuel gas discharge passage 23, the fuel gas circulation passage 24, a part of the fuel gas supply passage 22, and a fuel-gas passage formed in the fuel cell 15. The fuel-gas passage includes the inside-cell fuel gas passage 74. The fuel gas pump 44 configured to generate a driving force to cause the fuel exhaust gas to flow into the fuel gas supply passage 22 is provided in the fuel gas circulation passage 24. The flow rate of the fuel gas flowing through the fuel cell 15 can be changed based on the driving amount (rotational speed of a motor driving the pump 44) of the fuel gas pump 44. Further, the flow meter 26 configured to detect the flow rate of the fuel gas circulating through the passage is provided in the fuel gas discharge passage 23. The flow meter 26 can be used to acquire the flow rate of the fuel gas in the fuel cell 15.

The gas/liquid separator 45 is provided in a connecting portion between the fuel gas discharge passage 23 and the fuel gas circulation passage 24. The fuel exhaust gas includes impurities such as nitrogen and steam, in addition to hydrogen that has not been used for power generation. The gas/liquid separator 45 separates water from gas (hydrogen, nitrogen, and so on) in the fuel exhaust gas. A fuel gas outlet passage 25 including a purge valve 46 is connected to the gas/liquid separator 45, and when the purge valve 46 is opened, water and gas are discharged from the gas/liquid separator 45.

The oxidation gas system 30 includes an air compressor 31, an oxidation gas supply passage 32, an oxidation gas discharge passage 33, a flow meter 36, and a control valve 39. In the present embodiment, an oxidation gas supply device for adjusting the flow rate of the oxidation gas to be supplied to the fuel cell 15 includes the air compressor 31 and the control valve 39. The fuel cell system 10 of the present embodiment uses air as the oxidation gas. The air compressor 31 is a device configured to compress the air and discharge the air toward the inside-cell oxidation gas passage of the fuel cell 15 via the oxidation gas supply passage 32. The flow rate of the oxidation gas flowing through the fuel cell 15 can be changed based on the driving amount (rotational speed of a motor driving the air compressor 31) of the air compressor 31. An oxidation exhaust gas discharged from the fuel cell 15 is discharged outside the fuel cell system 10 via the oxidation gas discharge passage 33. The oxidation gas discharge passage 33 is provided with the control valve 39 configured to adjust degree flow passage area of the oxidation gas discharge passage 33. The pressure (back pressure) and the flow rate of the oxidation gas in an oxidation-gas passage formed in the fuel cell 15 can be changed by adjusting an opening degree of the control valve 39. The oxidation-gas passage includes the inside-cell oxidation gas passage 75. The flow meter 36 provided on the upstream side from the control valve 39 in the oxidation gas discharge passage 33 can be used to acquire the flow rate of the oxidation gas in the fuel cell 15.

The refrigerant system 60 includes a radiator 61, a refrigerant pump 62, a flow meter 63, and a refrigerant supply passage 64. In the present embodiment, a refrigerant supply device for adjusting the flow rate of the refrigerant to be supplied to the fuel cell 15 includes the refrigerant pump 62. The refrigerant system 60 may include a rotary valve which switches a passage where the refrigerant flows through the radiator 61 and a passage (bypass passage) where the refrigerant does not flow through the radiator 61. The rotary valve can switch a case where the refrigerant does not flow in the bypass passage and flows through the radiator 61 and a case where the refrigerant flows in the bypass passage and does not flow through the radiator 61. An amount of the refrigerant which flows in the bypass passage and an amount of the refrigerant which flows through the radiator 61 may be adjusted by adjusting a driving amount of the rotary valve. The refrigerant supply passage 64 is a passage that connects the radiator 61 to the refrigerant passage 77 in the fuel cell 15 and is configured to circulate the refrigerant between the radiator 61 and the fuel cell 15. The radiator 61 cools down the refrigerant flowing through the refrigerant supply passage 64. The refrigerant pump 62 generates a driving force to cause the refrigerant to flow through the refrigerant supply passage 64. The flow rate of the refrigerant flowing through the fuel cell 15 can be changed based on the driving amount (rotational speed of a motor driving the refrigerant pump 62) of the refrigerant pump 62. The flow meter 63 can be used to acquire the flow rate of the refrigerant in the fuel cell 15.

The controlling portion 50 is constituted as a logic circuit mainly based on a microcomputer. More specifically, the controlling portion 50 includes a CPU configured to execute computing and the like in accordance with a control program set in advance, a ROM in which a control program, control data, and the like necessary to execute various computing processes by the CPU are stored in advance, a RAM in which various data necessary to execute various computing processes by the CPU similarly to the above are read and written temporarily, an input/output port via which various signals are input/output, and so on. The controlling portion 50 performs a power generation control on the fuel cell system 10. For example, in order to obtain an electric power corresponding to a load request from the fuel cell 15, the controlling portion 50 sets respective flow rates of the fuel gas, the oxidation gas, and the refrigerant. Then, in order that the flow rates of the fuel gas, the oxidation gas, and the refrigerant reach respective set values, the controlling portion 50 outputs driving signals to the fuel gas pump 44, the injector 42, the air compressor 31, the control valve 39, and the refrigerant pump 62. The driving amounts of the fuel gas pump 44 and so on and target flow rates of the fuel gas, the oxidation gas, and the refrigerant can be set in advance in accordance with the amount of power to be generated by the fuel cell 15, for example. Further, the controlling portion 50 performs feedback control using detection signals of the flow meters 26, 36, 63, so as to further adjust at least some driving amounts selected from the driving amounts of the fuel gas pump 44, the injector 42, the air compressor 31, the control valve 39, and the refrigerant pump 62, thereby controlling the flow rates of respective fluids to reach their target flow rates corresponding to a power generation amount.

(A-2) Configuration of Inspection System of Fuel Cell:

In the present embodiment, when an impact is applied to the fuel cell 15, e.g., when a vehicle equipped with the fuel cell system 10 has a collision, whether or not a deformation occurs in the fuel cell 15 due to an impact is inspected. As illustrated in FIG. 1, an inspection system 12 for performing such an inspection has a configuration common with the fuel cell system 10 for power generation. In the present embodiment, the controlling portion 50 has a function to inspect the fuel cell 15 as a part of the inspection system 12, in addition to a function related to a power generation control of the fuel cell 15 as a part of the fuel cell system 10.

FIG. 1 illustrates functional blocks of the controlling portion 50 at the time when the inspection system 12 performs the above inspection. More specifically, the controlling portion 50 includes a storage portion 51, a detecting portion 52, a derivation portion 53, a determination portion 54, an acquisition portion 55, and a driving controlling portion 56 as the functional blocks. Operations of the functional blocks will be described later.

Figure 4:
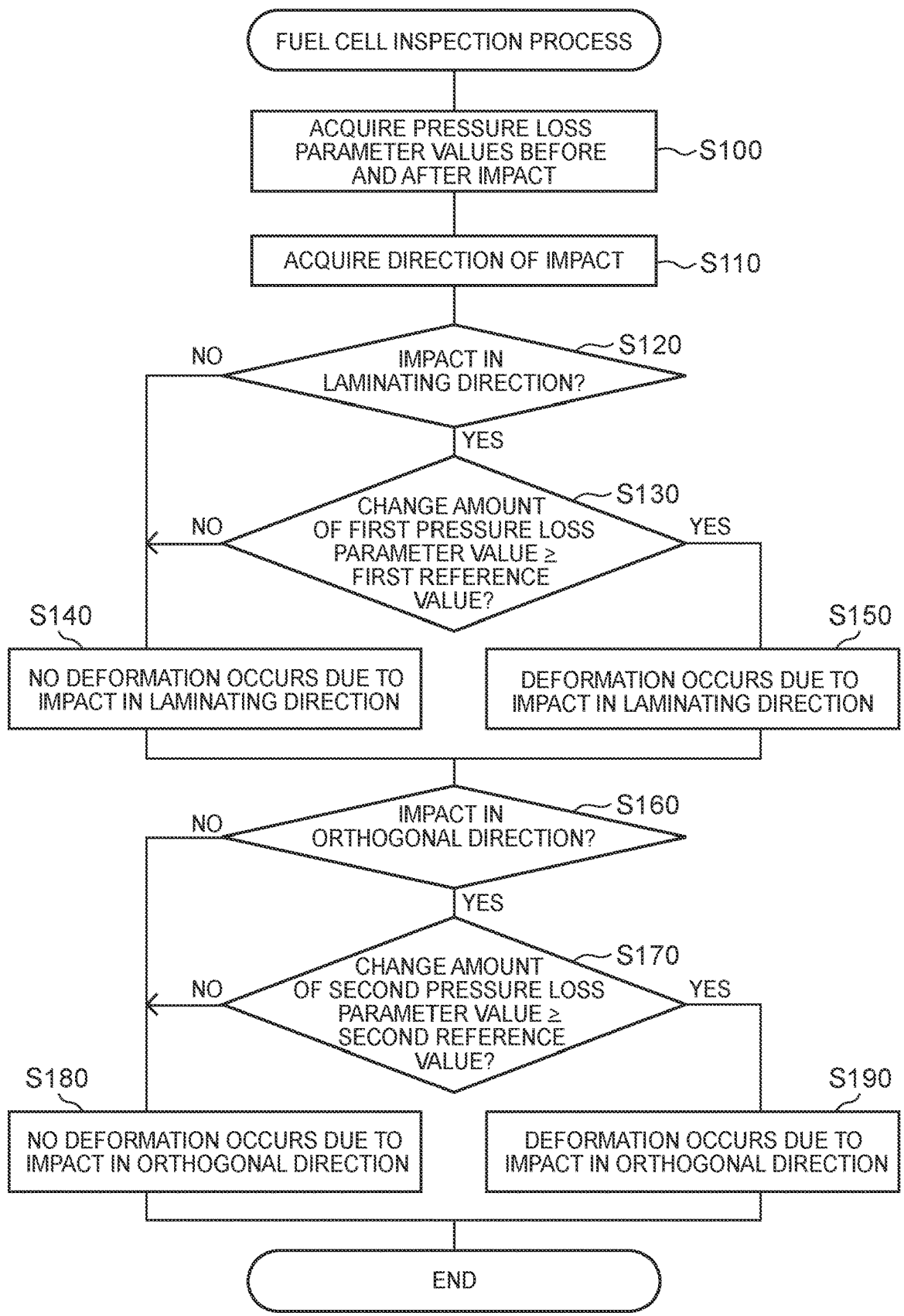
FIG. 4 is a flowchart illustrating a fuel cell inspection process routine.

(A-3) Inspection Method of Fuel Cell:

FIG. 4 is a flowchart illustrating a fuel cell inspection process routine executed by the CPU of the controlling portion 50. The routine is executed when an instruction to start the inspection is input into the controlling portion 50 at the time when the inspection is performed after an impact is applied to the fuel cell 15 due to a vehicle collision and the like. The instruction to start the inspection may be, for example, input by an inspector who handles the inspection system 12 into the controlling portion 50 of the fuel cell system 10 provided in the vehicle. Further, in a case where an input device or the like that receives an instruction input about the inspection is connected to the fuel cell system 10 at the time of the inspection, the instruction to start the inspection may be input by the inspector via the input device. Alternatively, the controlling portion 50 may determine that the instruction to start the inspection is input, by detecting connection of the input device.

The inspection after an impact may be performed by using the whole fuel cell system 10 as the inspection system 12 in a state where the fuel cell system 10 is provided in the vehicle. At the time when the fuel cell inspection process routine is executed, the fuel gas supply device, the oxidation gas supply device, and the refrigerant supply device as described above are driven by the driving controlling portion 56 of the controlling portion 50. The driving controlling portion 56 outputs, to compositions of each device described above such as the fuel gas supply device, driving signals corresponding to respective target values of the flow rates for respective fluid passages in the fuel cell 15. Then, the driving controlling portion 56 acquires detection signals from the flow meters 26, 36, 63 and performs the feedback control as described above. At the time of the inspection performed while respective fluids are supplied to the passages, power generation of the fuel cell 15 may be performed or may not be performed. At the time when power generation of the fuel cell 15 is performed, the vehicle may be in a running state, or the fuel cell 15 may be connected to a load for inspection so that a generated electric power is used.

When this routine is executed, the CPU of the controlling portion 50 acquires pressure loss parameter values before and after the impact (step S100). The pressure loss parameter value is a value of a pressure loss parameter that is a parameter correlated with a pressure loss in a fluid passage provided inside the fuel cell 15. In step S100 of the present embodiment, at least either one of a pressure loss parameter value in the fuel-gas passage and a pressure loss parameter value in the oxidation-gas passage, and a pressure loss parameter value in the refrigerant passage 77 are acquired. At the time of performing the inspection in the present embodiment, the flow rates of respective fluids to be supplied to the fuel cell 15 may be always constant or may be changed, but the pressure loss parameter values to be acquired in step S100 should be assumed as values obtained at the time when the fluids are introduced into the fuel cell 15 at respective flow rates determined in advance.

More specifically, the pressure loss parameter value in the fuel-gas passage can be, for example, a value of an electric power used by the fuel gas pump 44 when the flow rate of the fuel gas in the fuel-gas passage formed in the fuel cell 15 becomes a first flow rate determined in advance at the time when the driving amounts of devices included in the fuel gas supply device, except the fuel gas pump 44, are constant. Further, the pressure loss parameter value in the fuel-gas passage can be a value of the valve-opening duty ratio of the injector 42 when the flow rate of the fuel gas in the fuel-gas passage formed in the fuel cell 15 becomes a second flow rate determined in advance at the time when the driving amounts of devices included in the fuel gas supply device, except the injector 42, are constant. Further, the pressure loss parameter value in the fuel-gas passage can be a value of the flow rate of the fuel gas actually flowing through the fuel-gas passage formed in the fuel cell 15 when the fuel gas supply device is driven at a command value determined in advance so that the flow rate of the fuel gas in the fuel-gas passage becomes a third flow rate determined in advance. That is, the pressure loss parameter value in the fuel-gas passage can be at least any one of the value of the electric power used by the fuel gas pump 44, the value of the valve-opening duty ratio in the injector 42, and the value of the flow rate of the fuel gas that actually flows.

At the time when the fuel gas supply device is driven so that the flow rate of the fuel gas in the fuel-gas passage becomes a set value determined in advance, feedback control is performed by use of the detection signal of the flow meter 26 as described above. On this account, when the flow rate of the fuel gas is controlled so as to become the set value at the time when the pressure loss in the fuel-gas passage increases, the value of the electric power used by the fuel gas pump 44 and/or the value of the valve-opening duty ratio in the injector 42 increases. Further, if the pressure loss in the fuel-gas passage formed in the fuel cell 15 increases at the time when the fuel gas supply device is driven at a command value determined in advance so that the flow rate of the fuel gas in the fuel-gas passage becomes the third flow rate determined in advance, the value of the flow rate of the fuel gas actually flowing through the fuel-gas passage is decreased relative to the command value.

The pressure loss parameter value in the oxidation-gas passage can be, for example, a value of an electric power used by the air compressor 31 when the flow rate of the oxidation gas in the oxidation-gas passage formed in the fuel cell 15 becomes a fourth flow rate determined in advance at the time when the driving amounts of devices included in the oxidation gas supply device, except the air compressor 31, are constant. Further, the pressure loss parameter value in the oxidation-gas passage can be, for example, a value of the opening degree of the control valve 39 when the flow rate of the oxidation gas in the oxidation-gas passage formed in the fuel cell becomes a fifth flow rate determined in advance at the time when the driving amounts of devices included in the oxidation gas supply device, except the control valve 39, are constant. Further, the pressure loss parameter value in the oxidation-gas passage can be a value of the flow rate of the oxidation gas actually flowing through the oxidation-gas passage formed in the fuel cell 15 when the oxidation gas supply device is driven at a command value determined in advance so that the flow rate of the oxidation gas in the oxidation-gas passage becomes a sixth flow rate determined in advance. That is, the pressure loss parameter value in the oxidation-gas passage can be at least any one of the value of the electric power used by the air compressor 31, the value of the opening degree of the control valve 39, and the value of the flow rate of the oxidation gas that actually flows.

At the time when the oxidation gas supply device is driven so that the flow rate of the oxidation gas in the oxidation-gas passage becomes a set value determined in advance, feedback control is performed by use of the detection signal of the flow meter 36 as described above. On this account, when the flow rate of the oxidation gas is controlled so as to become the set value at the time when the pressure loss in the oxidation-gas passage increases, the value of the electric power used by the air compressor 31 and/or the value of the opening degree of the control valve 39 increase. Further, if the pressure loss in the oxidation-gas passage formed in the fuel cell 15 increases at the time when the oxidation gas supply device is driven at a command value determined in advance so that the flow rate of the oxidation gas in the oxidation-gas passage becomes the sixth flow rate determined in advance, the value of the flow rate of the oxidation gas actually flowing through the oxidation-gas passage decreases relative to the command value.

The pressure loss parameter value in the refrigerant passage 77 can be, for example, a value of an electric power used by the refrigerant pump 62 when the flow rate of the refrigerant in the refrigerant passage 77 formed in the fuel cell 15 becomes a seventh flow rate determined in advance at the time when the driving amounts of devices (e.g., the rotary valve provided on the refrigerant system 60) included in the refrigerant supply device, except the refrigerant pump 62, are constant. Further, the pressure loss parameter value in the refrigerant passage 77 can be a value of the flow rate of the refrigerant actually flowing through the refrigerant passage 77 formed in the fuel cell 15 when the refrigerant supply device is driven at a command value determined in advance so that the flow rate of the refrigerant in the refrigerant passage 77 becomes an eighth flow rate determined in advance. That is, the pressure loss parameter value in the refrigerant passage 77 can be at least either one of the value of the electric power used by the refrigerant pump 62 and the value of the flow rate of the refrigerant that actually flows.

At the time when the refrigerant supply device is driven so that the flow rate of the refrigerant in the refrigerant passage 77 becomes a set value determined in advance, feedback control is performed by use of the detection signal of the flow meter 63 as described above. On this account, when the flow rate of the refrigerant is controlled so as to become the set value determined in advance at the time when the pressure loss in the refrigerant passage 77 increases, the value of the electric power used by the refrigerant pump 62 increases. Further, if the pressure loss in the refrigerant passage 77 increases at the time when the refrigerant supply device is driven at a command value determined in advance so that the flow rate of the refrigerant in the refrigerant passage 77 formed in the fuel cell 15 becomes the eighth flow rate determined in advance, the value of the flow rate of the refrigerant actually flowing through the refrigerant passage 77 decreases relative to the command value.

Parameter values other than those described above may be used as the pressure loss parameter value in the fuel-gas passage, the pressure loss parameter value in the oxidation-gas passage, and the pressure loss parameter value in the refrigerant passage 77, and values of parameters correlated with the pressure losses in respective fluid passages may be used. For example, in a case where the fuel gas supply device, the oxidation gas supply device, or the refrigerant supply device has a configuration different from that in the fuel cell system 10 in FIG. 1, a pressure loss parameter value to be used should be selected appropriately depending on a configuration of a fluid supply device to be employed. The pressure loss parameter value in the fuel-gas passage and the pressure loss parameter value in the oxidation-gas passage are also referred to as a first pressure loss parameter value.

The pressure loss parameter value in the refrigerant passage 77 is also referred to as a second pressure loss parameter value.

As the pressure loss parameter value before the impact is applied, original pressure loss parameter values set at the time of manufacture of the fuel cell system 10 and stored in the storage portion 51 in advance should be employed. In step S100, the controlling portion 50 acquires the pressure loss parameter value before the impact is applied, by reading information stored in the storage portion 51 in the controlling portion 50.

In step S100, the detecting portion 52 in the controlling portion 50 performs acquisition of a pressure loss parameter value after the impact is applied. When the pressure loss parameter value is a value selected from the value of the electric power used by the fuel gas pump 44, the value of the valve-opening duty ratio in the injector 42, the value of the electric power used by the air compressor 31, the value of the opening degree of the control valve 39, and the value of the electric power used by the refrigerant pump 62, the pressure loss parameter value after the impact is applied can be found from a driving command value from the driving controlling portion 56 when the flow rate of the fluid becomes a flow rate determined in advance by the feedback control. In the meantime, in a case where the pressure loss parameter value is a value of a flow rate of a fluid that actually flows in a fluid (fuel-gas, oxidation-gas, refrigerant) passage in the fuel cell 15 at the time when a fluid supply device is driven at a command value determined in advance so that the fluid flows through the fluid passage at each of the flow rates determined in advance, the pressure loss parameter value after the impact is applied can be found from the detection value of the flow meter 26, 36, 63 to be obtained when the fluid supply device is driven at the command value determined in advance at the time when the inspection starts. In step S100, the detecting portion 52 acquires the pressure loss parameter value after the impact is applied, from the driving controlling portion 56 or the flow meter 26, 36, 63.

After step S100, the CPU of the controlling portion 50 acquires a direction of the impact applied to the fuel cell 15 (step S110). The acquisition portion 55 of the controlling portion 50 performs the acquisition of the direction of the impact. An inspector may visually observe the appearance of the fuel cell 15 after the impact is applied and input the direction of the impact via the input device (described above). Alternatively, the direction of the impact may be acquired such that information detected by a sensor provided in the vehicle equipped with the fuel cell system 10, e.g., a pressure sensor for airbag or an acceleration sensor is acquired from the sensor.

After step S110, based on the direction acquired in step S110, the CPU of the controlling portion 50 determines whether or not the impact in the laminating direction is applied to the fuel cell 15 (step S120). When the impact in the laminating direction is not applied (step S120: NO), the CPU of the controlling portion 50 determines that no deformation has occurred due to the impact in the laminating direction in the fuel cell 15 (step S140).

When the impact in the laminating direction is applied (step S120: YES), the CPU of the controlling portion 50 compares the first pressure loss parameter value before the impact with the first pressure loss parameter value after the impact so as to find a change amount of the first pressure loss parameter value, indicative of an increase from a pressure loss before the impact to a pressure loss after the impact, and the CPU of the controlling portion 50 compares the change amount thus found with a first reference value determined in advance (step S130). The change amount, for example, is a remainder between the first pressure loss parameter value before the impact and the first pressure loss parameter value after the impact. When the change amount of the first pressure loss parameter value is less than the first reference value (step S130: NO), the CPU of the controlling portion 50 determines that no deformation has occurred due to the impact in the laminating direction in the fuel cell 15 (step S140). When the change amount of the first pressure loss parameter value is the first reference value or more (step S130: YES), the CPU of the controlling portion 50 determines that a deformation has occurred due to the impact in the laminating direction in the fuel cell 15 (step S150). The determination in step S150 is also referred to as a first determination.

A process of deriving the change amount from the first pressure loss parameter value before the impact to the first pressure loss parameter value after the impact is performed by the derivation portion 53 of the controlling portion 50. A process of determining whether a deformation caused due to the impact in the laminating direction occurs or not, by comparing the change amount of the first pressure loss parameter value with the first reference value, is performed by the determination portion 54 of the controlling portion 50.

The first reference value to be used in step S130 is determined in advance and stored in the storage portion 51 of the controlling portion 50 as a reference value based on which it is determined whether or not a deformation occurs in the fuel cell 15 due to the impact in the laminating direction. In a case where several types of first pressure loss parameter values are used as the first pressure loss parameter value, respective first reference values are determined for those types of first pressure loss parameter values. The first reference value is a value based on which it can be determined that a deformation to such an extent that the fuel cell 15 should be replaced occurs in the fuel cell 15, for example, and is determined in advance by experiment or simulation.

Figure 5:
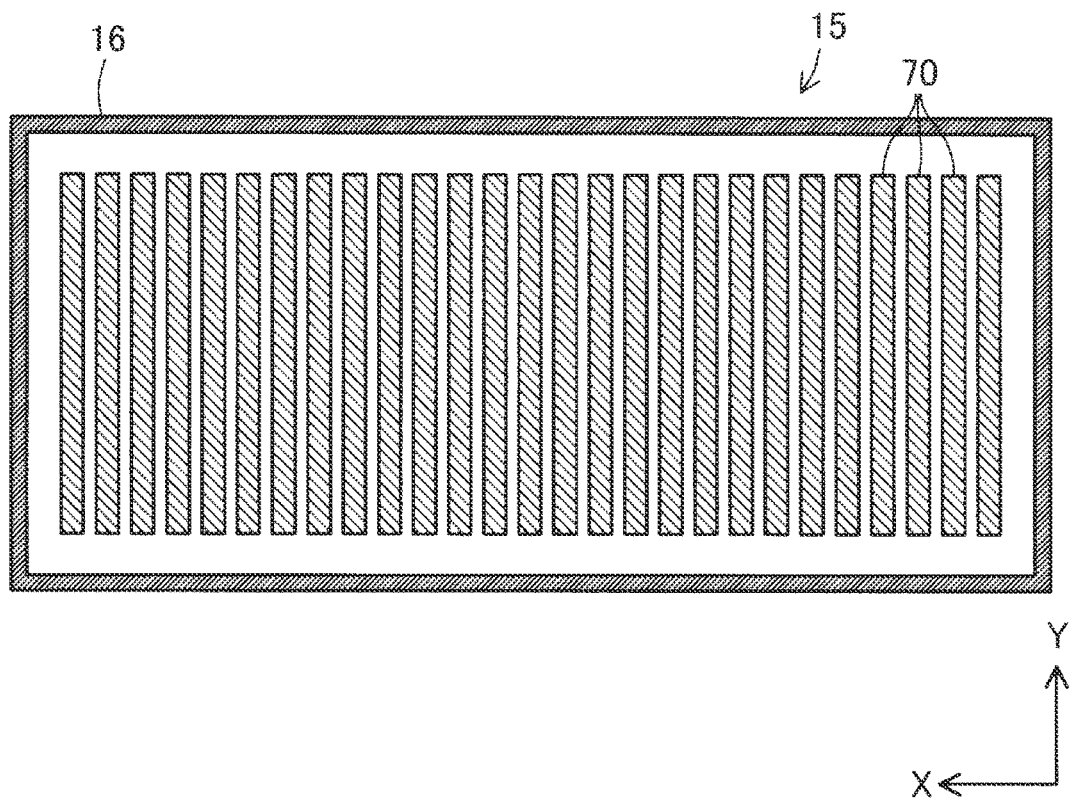
FIG. 5 is a sectional schematic view illustrating a schematic configuration of a fuel cell.
Figure 6:
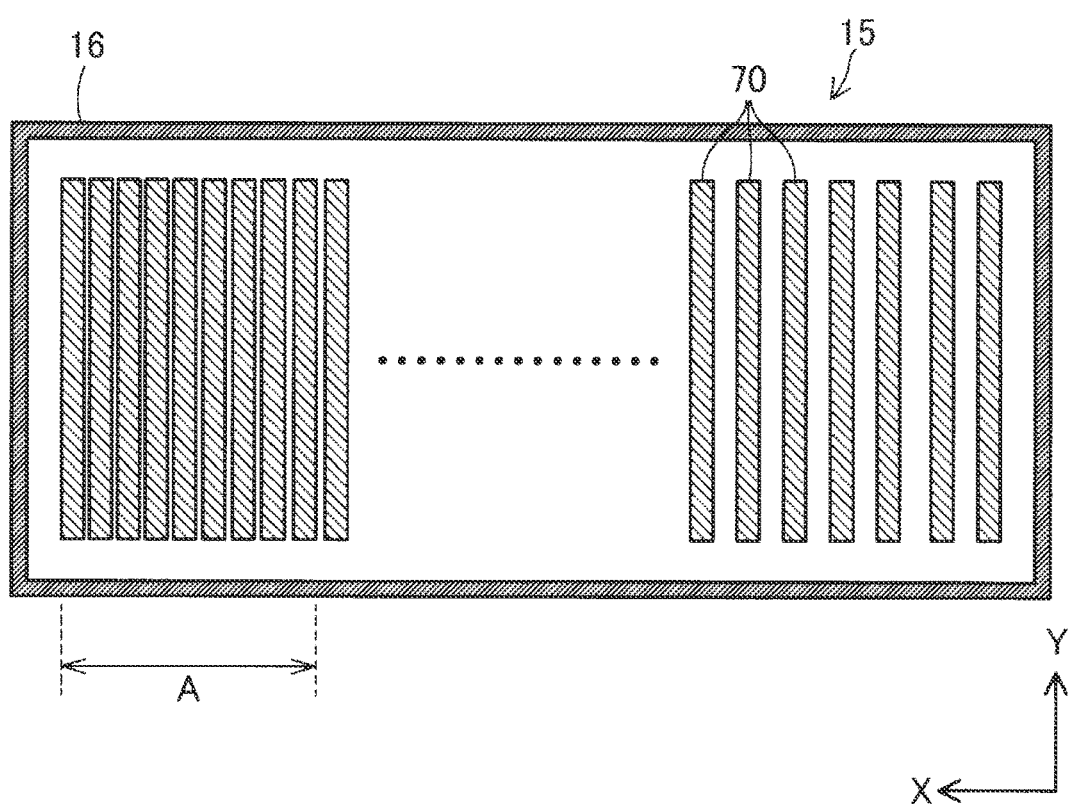
FIG. 6 is a sectional schematic view illustrating a state of the fuel cell that has received an impact in a laminating direction.
Figure 7:
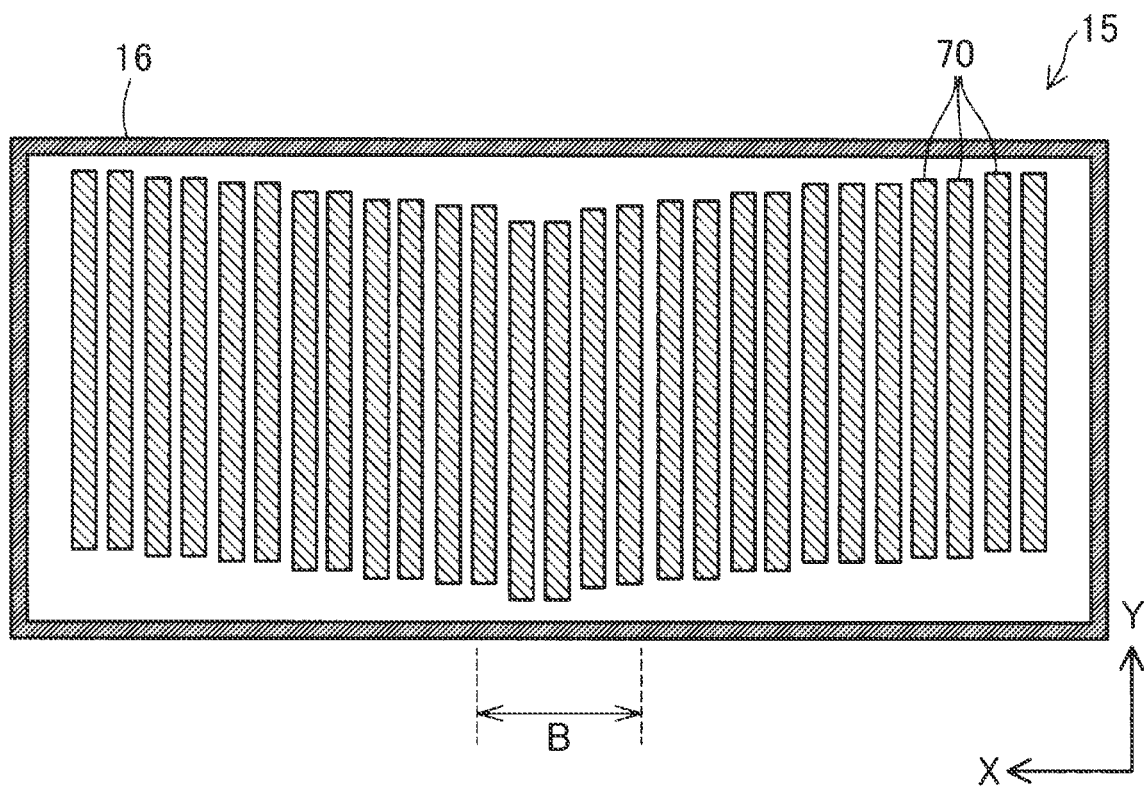
FIG. 7 is a sectional schematic view illustrating a state of the fuel cell that has received an impact in an orthogonal direction.

FIG. 5 is a sectional schematic view illustrating a schematic configuration of the fuel cell 15. In the fuel cell 15, a fuel cell stack in which the single cells 70 are laminated is stored in the stack case 16. In FIG. 5 and FIGS. 6, 7 described below, the laminating direction is along an X-direction and an orthogonal direction that is orthogonal to the laminating direction is along a Y-direction.

FIG. 6 is a sectional schematic view illustrating a state of the fuel cell 15 after the fuel cell 15 has received an impact in the laminating direction, more specifically, an impact in a −X-direction. When the impact in the laminating direction is applied to the fuel cell 15, a force to compress the single cells 70 in the laminating direction is applied on a front side of the fuel cell 15 to which the impact is applied. At this time, in each single cell 70 placed on the front side, the gas diffusion layers 87, 88 that are relatively soft members and the resin frame 82 are crushed in the laminating direction. As a result, the inside-cell fuel gas passage and the inside-cell oxidation gas passage formed by the gas diffusion layers 87, 88 or the gas passages formed by the slit portions 83 of the resin frame 82 are crushed. Especially, the gas diffusion layers 87, 88 are easily crushed. As a result, the pressure losses in the inside-cell fuel gas passage and the inside-cell oxidation gas passage increase. On this account, when the impact in the laminating direction is applied to the fuel cell 15, change amounts of the first pressure loss parameter values as the pressure loss parameter values in the fuel-gas passage and the oxidation-gas passage are compared with the first reference value, so that it is possible to determine whether a deformation has occurred due to the impact in the laminating direction in the fuel cell 15 or not.

Referring back to FIG. 4, after the determination in step S140 or step S150, the CPU of the controlling portion 50 determines, based on the direction acquired in step S110, whether or not an impact in the orthogonal direction is applied to the fuel cell 15 (step S160). When the impact in the orthogonal direction is not applied (step S160: NO), the CPU of the controlling portion 50 determines that no deformation has occurred due to the impact in the orthogonal direction in the fuel cell 15 (step S180), and the CPU of the controlling portion 50 finishes the inspection process.

When the impact in the orthogonal direction is applied (step S160: YES), the CPU of the controlling portion 50 compares the second pressure loss parameter value before the impact with the second pressure loss parameter value after the impact so as to find a change amount of the second pressure loss parameter value, indicative of an increase from a pressure loss before the impact to a pressure loss after the impact, and the CPU of the controlling portion 50 compares the change amount thus found with a second reference value determined in advance (step S170). When the change amount of the second pressure loss parameter value is less than the second reference value (step S170: NO), the CPU of the controlling portion 50 determines that no deformation has occurred due to the impact in the orthogonal direction in the fuel cell 15 (step S180), and the CPU of the controlling portion 50 finishes the inspection process. When the change amount of the second pressure loss parameter value is the second reference value or more (step S170: YES), the CPU of the controlling portion 50 determines that a deformation occurred due to the impact in the orthogonal direction in the fuel cell 15 (step S190), and the CPU of the controlling portion 50 finishes the inspection process. The determination in step S190 is also referred to as a second determination.

A process of deriving the change amount from the second pressure loss parameter value before the impact to the second pressure loss parameter value after the impact is performed by the derivation portion 53 of the controlling portion 50. A process of determining whether a deformation caused due to the impact in the orthogonal direction occurs or not, by comparing the change amount of the second pressure loss parameter value with the second reference value, is performed by the determination portion 54 of the controlling portion 50.

The second reference value to be used in step S170 is determined in advance and stored in the storage portion 51 of the controlling portion 50 as a reference value based on which it is determined whether a deformation has occurred due to the impact in the orthogonal direction in the fuel cell 15 or not. In a case where several types of second pressure loss parameter values are used as the second pressure loss parameter value, respective second reference values are determined for those types of second pressure loss parameter values. The second reference value is a value based on which it can be determined that a deformation to such an extent that the fuel cell 15 should be replaced occurs in the fuel cell 15, for example, and is determined in advance by experiment or simulation.

Figure 8A:
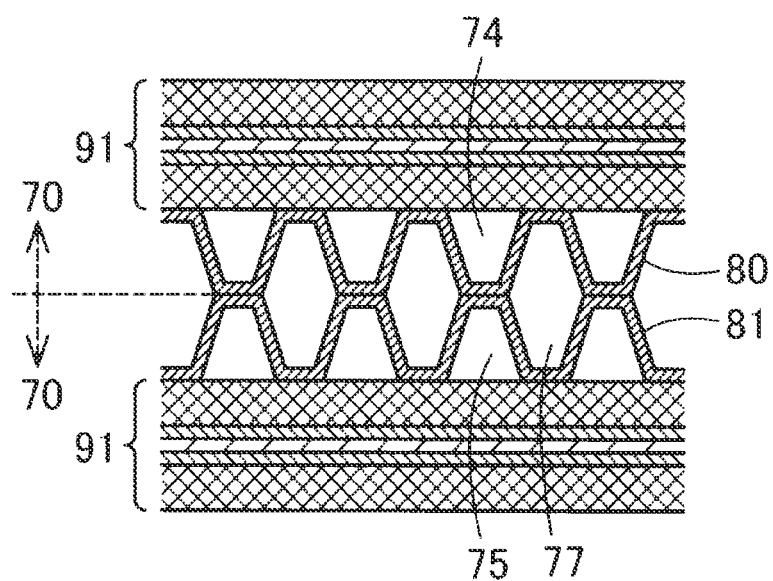
FIG. 8A is a sectional schematic view illustrating a state where single cells are adjacent to each other before an impact is applied.
Figure 8B:
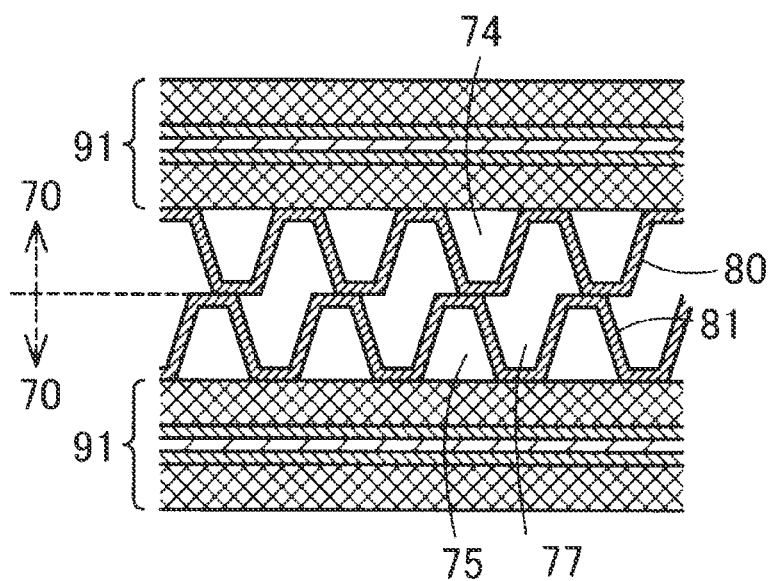
FIG. 8B is a sectional schematic view illustrating a state where the single cells are adjacent to each other after the impact is applied.

FIG. 7 is a sectional schematic view illustrating a state of the fuel cell 15 after the fuel cell 15 has received the impact in the orthogonal direction, more specifically, an impact in a −Y-direction. Further, FIGS. 8A and 8B are sectional schematic views illustrating a state of a part near the refrigerant passage 77 formed between adjacent single cells 70. FIG. 8A illustrates a state before an impact is applied, and FIG. 8B illustrates a state after the impact is applied.

When the impact in the orthogonal direction is applied to the fuel cell 15, a lamination deviation occurs in the laminated single cells 70 along the direction of the impact in a part to which the impact is applied (an intermediate part of the fuel cell stack in the laminating direction in FIG. 7), as illustrated in FIG. 7. As described above, the single cell 70 is formed in an integrated manner as a whole such that members including the gas separators 80, 81, more specifically, the resin frame 82 and the gas separators 80, 81 are bonded to each other. In the meantime, the adjacent single cells 70 are fixed such that a fastening load in the laminating direction is applied to them in a state where the gasket 76 bonded to one of the single cells 70 is placed therebetween. On this account, when the impact in the orthogonal direction is applied, a lamination deviation occurs between the adjacent single cells 70 fixed with a lower fixation force. As a result, the refrigerant passage 77 formed between the single cells 70 deforms.

As illustrated in FIG. 8A, before the impact is applied, the gas separator 80 of one of the adjacent single cells 70 and the gas separator 81 of the other one of the adjacent single cells 70 are placed such that respective head portions of projections of their irregular shapes to form the refrigerant passage 77 make contact with each other, and the refrigerant passage 77 is constituted by respective recesses provided in the irregular shapes. When the impact in the orthogonal direction is applied, the head portions of the projections making contact with each other deviate from each other in the orthogonal direction, as illustrated in FIG. 8B. As a result, the sectional shape of the refrigerant passage 77 deforms, so that a passage resistance in the refrigerant passage 77 increases. On this account, when the impact in the orthogonal direction is applied to the fuel cell 15, the change amount of the second pressure loss parameter value as the pressure loss parameter value in the refrigerant passage 77 is compared with the second reference value, so that it can be determined whether a deformation has occurred due to the impact in the orthogonal direction in the fuel cell 15 or not.

In the first embodiment configured as such, a deformation inside the fuel cell 15 due to an impact is determined based on a change amount from a pressure loss parameter value before the impact is applied to the fuel cell 15 to a pressure loss parameter value after the impact is applied to the fuel cell 15. On this account, by a simple and easy method in which pressure loss parameter values are acquired by introducing a fluid into a passage inside the fuel cell 15 and a change amount from the pressure loss parameter value before an impact is applied to the fuel cell 15 to the pressure loss parameter value after the impact is applied to the fuel cell 15 is compared with a reference value, it is possible to determine that a deformation occurs inside the fuel cell 15 due to the impact. That is, such an inspection method is performed by use of the configuration of the fuel cell system 10. Accordingly, a deformation of the fuel cell 15 due to an impact can be detected with a simple and easy configuration and process or operation without performing such a complicated operation that a special configuration for inspection, e.g., a mark or the like to detect a deformation of the fuel cell 15 is provided in the fuel cell 15 and observed. As a result, when the fuel cell 15 deforms due to an impact, it is possible to appropriately determine whether the fuel cell 15 should be replaced or not, for example.

Further, in the present embodiment, when the impact received by the fuel cell 15 is along the laminating direction, whether or not a deformation occurs is determined by use of the first pressure loss parameter value related to a gas passage, and when the impact received by the fuel cell 15 is along the orthogonal direction, whether or not a deformation occurs is determined by use of the second pressure loss parameter value related to the refrigerant passage 77. On this account, it is possible to appropriately determine whether a deformation occurs in the fuel cell 15 or not, in accordance with the direction of the impact. Further, even if a pressure loss parameter value that does not correspond to the direction of the impact changes at the time when a fluid passage is blocked up due to a factor different from the impact, it is possible to restrain a false determination that a deformation occurs due to the impact, thereby making it possible to improve accuracy of the inspection.

Further, in the present embodiment, the direction of the impact that causes a deformation of the fuel cell 15 is specified. Accordingly, it is possible to appropriately replace some of the laminated single cells 70 instead of replacing the whole fuel cell 15. For example, as illustrated in FIG. 6, when the fuel cell 15 receives an impact in the −X-direction, particularly the gas diffusion layers 87, 88 and the like are largely crushed in the single cells 70 laminated on the front side to which the impact is applied, e.g., within a range indicated as a range A in FIG. 6. On this account, when the impact in the laminating direction is applied, only the single cells 70 on the front side to which the impact is applied may be replaced. Further, as illustrated in FIG. 7, when the fuel cell 15 receives an impact in the −Y-direction, a large lamination deviation occurs in the single cells 70 laminated in an intermediate part of the fuel cell stack to which the impact is applied, e.g., within a range indicated as a range B in FIG. 7. In such a part with a large lamination deviation, the single cell 70 might deform such that the outer periphery of the single cell 70 abuts with an inner wall surface of the stack case 16. On this account, when the impact in the orthogonal direction is applied, only the single cells 70 within the range B to which the impact is applied may be replaced.

Note that, in a case where the direction of the impact applied to the fuel cell 15 is a direction inclined to the laminating direction, the CPU of the controlling portion 50 determines, in step S120 (FIG. 4), that there is an impact in the laminating direction, and the CPU of the controlling portion 50 determines, in step S160 (FIG. 4), that there is an impact in the orthogonal direction. Then, the CPU of the controlling portion 50 performs both the determination using the first pressure loss parameter value and the determination using the second pressure loss parameter value. Alternatively, the CPU of the controlling portion 50 may make the inspection efficient by performing a determination using only a pressure loss parameter value corresponding to the direction of a larger component out of a component in the laminating direction and a component in the orthogonal direction in the received impact.

Further, in the present embodiment, whether a deformation occurs in the fuel cell 15 or not is determined based on an increase in pressure loss in a fluid passage by use of a pressure loss parameter value. Accordingly, it is possible to improve accuracy of determination on a deformation of the fuel cell 15. An example of the method for determining a deformation of the fuel cell is a method in which a mark extending in the laminating direction is provided on a side face of the fuel cell and deviation of the mark is visually observed from outside the stack case. However, there might be such a case that, even when the amount of deviation is to such an extent that it is difficult to determine the deviation of the mark by visual observation, a pressure loss increases as a whole passage inside the fuel cell due to a deformation of the whole fuel cell. Even in such a case, with the use of the inspection method of the present embodiment, it is possible to determine a deformation of the fuel cell with high accuracy and to more appropriately determine replacement of the fuel cell in which battery performance is lowered.

Further, as a method for determining whether or not the fuel cell should be replaced after the fuel cell receives an impact, such a method is conceivable that information detected by the pressure sensor for airbag or the acceleration sensor provided in the fuel cell vehicle is used. However, such sensors provided for other purposes are generally provided at positions distanced from the fuel cell, and accuracy to detect the impact received by the fuel cell 15 might become insufficient. In the present embodiment, the pressure loss parameter values in the fuel cell 15 are used, so that it is possible to detect a deformation of the fuel cell 15 due to an impact received by the fuel cell 15 with high accuracy.

Note that, in a case of using several types of first pressure loss parameter values in step S130 illustrated in FIG. 4 or in a case of using several types of second pressure loss parameter values in step S170, when all pressure loss parameter values to be used for determination are their corresponding reference values or more, for example, it can be determined that a deformation has occurred due to an impact in a corresponding direction. Further, when at least one of the several types of pressure loss parameter values to be used for determination is its corresponding reference value or more, it may be determined that a deformation has occurred due to the impact. Hereby, even in a case where a smaller impact is applied, it is possible to detect a deformation of the fuel cell 15.

B. Second Embodiment

FIG. 9 is a flowchart illustrating a fuel cell inspection process routine executed by the CPU of the controlling portion 50 in the inspection system 12 as the second embodiment of the disclosure. The inspection system 12 of the second embodiment has the same configuration as that of the first embodiment, so the same reference numerals are used, and detailed descriptions are omitted. Further, in FIG. 9, the same step number is assigned to a step common with FIG. 4, and a detailed description thereof is omitted. The fuel cell inspection process routine of FIG. 9 is executed instead of the inspection process routine illustrated in FIG. 4 in the inspection system 12.

When this routine is executed, the CPU of the controlling portion 50 acquires pressure loss parameter values before and after an impact (step S100) and acquires a direction of the impact applied to the fuel cell 15 (step S110). Based on a result of step S110, the CPU of the controlling portion 50 determines the direction of the impact (step S220). Note that, when the direction of the impact applied to the fuel cell 15 is a direction inclined to the laminating direction, a direction corresponding to a larger one of a component in the laminating direction and a component in the orthogonal direction in the received impact is determined as the direction of the impact in step S220.

In a case where it is determined, in step S220, that the direction of the impact is the laminating direction, the CPU of the controlling portion 50 compares the change amount of the first pressure loss parameter value with the first reference value (step S130: NO). When the change amount of the first pressure loss parameter value is less than the first reference value, the CPU of the controlling portion 50 determines that no deformation has occurred due to the impact in the laminating direction (step S140), and the CPU of the controlling portion 50 finishes the routine. Further, in step S130, when the change amount of the first pressure loss parameter value is the first reference value or more, the CPU of the controlling portion 50 determines that a deformation has occurred due to the impact in the laminating direction (step S150), and the CPU of the controlling portion 50 finishes the routine.

In a case where it is determined, in step S220, that the direction of the impact is the orthogonal direction, the CPU of the controlling portion 50 compares the change amount of the second pressure loss parameter value with the second reference value (step S170). When the change amount of the second pressure loss parameter value is less than the second reference value, the CPU of the controlling portion 50 determines that no deformation has occurred due to the impact in the orthogonal direction (step S180), and the CPU of the controlling portion 50 finishes the routine. Further, when the change amount of the second pressure loss parameter value is the second reference value or more in step S170, the CPU of the controlling portion 50 determines that a deformation has occurred due to the impact in the orthogonal direction (step S190), and the CPU of the controlling portion 50 finishes the routine.

With the second embodiment configured as such, it is possible to obtain the same effect as that in the first embodiment. Further, the direction of the impact is determined in advance, and then, determination on a deformation is performed only about a pressure loss parameter value corresponding to the direction of the impact, thereby making it possible to make the inspection process efficient.

Note that, in FIG. 9, the CPU of the controlling portion 50 first acquires the first pressure loss parameter values and the second pressure loss parameter values before and after the impact (step S100), and after that, the direction of the impact is obtained (step S110), but other configurations may be employed. For example, the CPU of the controlling portion 50 may first acquire the direction of the impact (step S110) and then determine the direction of the impact (step S220), and when the direction of the impact is determined to be the laminating direction, the CPU of the controlling portion 50 may acquire the first pressure loss parameter values before and after the impact and then perform the processes of steps S130 to S150. Further, in a case where it is determined, in step S220, that the direction of the impact is the orthogonal direction, the CPU of the controlling portion 50 may acquire the second pressure loss parameter values before and after the impact and then perform the processes of steps S170 to S190.

C. Third Embodiment

Figure 10:
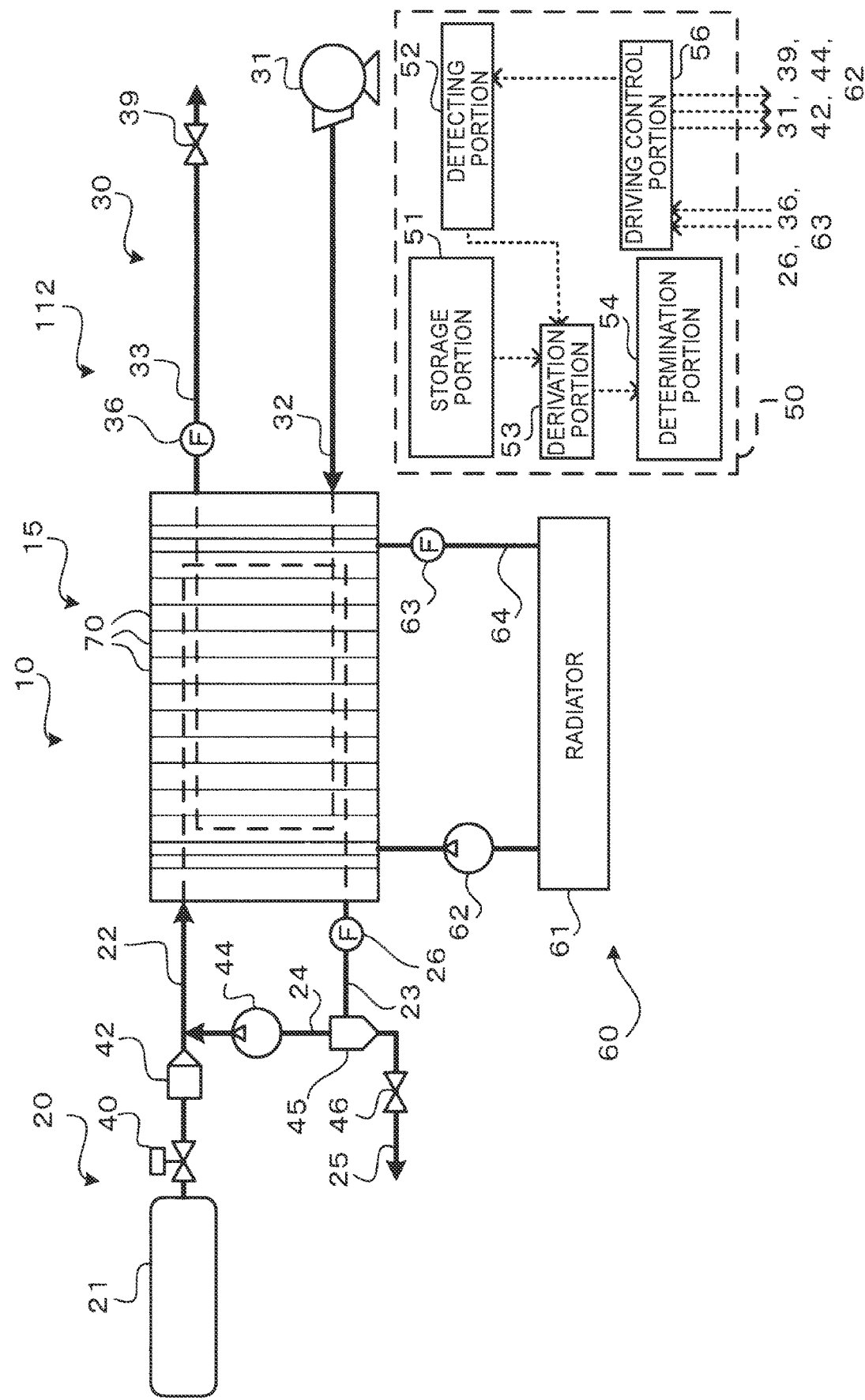
FIG. 10 is an explanatory view illustrating a schematic configuration of a fuel cell system.

FIG. 10 is an explanatory view illustrating a schematic configuration of an inspection system 112 as the third embodiment of the disclosure. The inspection system 112 has a configuration similar to that of the inspection system 12 of the first embodiment, except that the controlling portion 50 does not include the acquisition portion 55. On this account, the same reference numeral is assigned to a portion common with the inspection system 12 and a detailed description thereof is omitted.

FIG. 11 is a flowchart illustrating a fuel cell inspection process routine executed by the CPU of the controlling portion 50 in the inspection system 112 as the third embodiment of the disclosure. In FIG. 11, the same step number is assigned to a step common with FIG. 4 and a detailed description thereof is omitted. Similarly to the first embodiment, the fuel cell inspection process routine of FIG. 11 is executed such that an instruction to start the inspection is input into the controlling portion 50 after an impact is applied to the fuel cell 15 due to a collision or the like of a vehicle equipped with the fuel cell system 10.

When this routine is executed, the CPU of the controlling portion 50 acquires pressure loss parameter values before and after the impact (step S100). After that, the CPU of the controlling portion 50 compares the change amount of the first pressure loss parameter value with the first reference value (step S130). When the change amount of the first pressure loss parameter value is less than the first reference value, the CPU of the controlling portion 50 determines that no deformation has occurred due to the impact in the laminating direction (step S140), and when the change amount of the first pressure loss parameter value is the first reference value or more, the CPU of the controlling portion 50 determines that a deformation has occurred due to the impact in the laminating direction (step S150).

Further, the CPU of the controlling portion 50 compares the change amount of the second pressure loss parameter value with the second reference value (step S170). When the change amount of the second pressure loss parameter value is less than the second reference value, the CPU of the controlling portion 50 determines that no deformation has occurred due to the impact in the orthogonal direction (step S180), and the CPU of the controlling portion 50 finishes the routine. When the change amount of the second pressure loss parameter value is the second reference value or more in step S170, the CPU of the controlling portion 50 determines that a deformation has occurred due to the impact in the orthogonal direction (step S190), and the CPU of the controlling portion 50 finishes the routine.

With the third embodiment configured as such, similarly to the first embodiment, a deformation of the fuel cell 15 due to an impact can be detected with a simple and easy configuration and process or operation without providing a special configuration for inspection in the fuel cell 15. Further, the determination on a deformation of the fuel cell 15 due to an impact is performed by use of both of the change amount of the first pressure loss parameter value and the change amount of the second pressure loss parameter value. Accordingly, it is not necessary to perform the determination by acquiring the direction of the impact, thereby making it possible to simplify the operation of the inspection process. That is, the first pressure loss parameter value changes mainly in accordance with a deformation caused due to the impact in the laminating direction, and the second pressure loss parameter value changes mainly in accordance with a deformation caused due to the impact in the orthogonal direction. Hereby, even in a case where an impact in either direction is applied, when the determination is performed by use of both pressure loss parameter values as such, it is possible to detect a deformation of the fuel cell 15 due to an impact with high accuracy without determining the direction of the impact in advance.

Like the first or second embodiment, in a case where a direction of an impact is determined in advance, the direction of the impact can be found such that an inspector visually observes the appearance of the fuel cell 15 after the impact, for example. However, even in a direction where no damage is observed on the appearance, the fuel cell 15 may receive an impact. Further, the direction of the impact can be also found from information detected by a sensor for airbag or the like provided in the fuel cell vehicle. However, when the fuel cell 15 collides with its peripheral member inside the vehicle after the vehicle has received an impact, the fuel cell 15 may further receive an impact. With the present embodiment, even in such a case, it is possible to detect a deformation of the fuel cell 15 due to an impact applied to the fuel cell 15 with high accuracy.

Further, in the third embodiment, it is possible to specify a direction of an impact without determining the direction of the impact in advance. Accordingly, as described above based on FIGS. 6 and 7, it is possible to appropriately replace some of the single cells 70 when the fuel cell 15 deforms due to the impact.

D. Other Embodiments

The fuel cell 15 in the first to third embodiments is a drive power supply for a vehicle, but other configurations may be employed. Even in a case where the fuel cell 15 is used as a drive power supply for a movable body other than a vehicle or even in a case where the fuel cell 15 is used as a stationary power supply, when the fuel cell 15 receives an impact from outside, a similar inspection method can be employed.

In the first and second embodiments, a direction of an impact is acquired in advance so that occurrence of a deformation due to an impact in the laminating direction and occurrence of a deformation due to an impact in the orthogonal direction can be detected, but other configurations may be employed. For example, in a case where it is considered that a direction of an impact applied to the fuel cell 15 is uniform, acquisition of the direction of the impact and a determination using a pressure loss parameter value related to a direction where the impact is not applied may not be performed. Alternatively, in a case where a method different from the method using a pressure loss parameter value is employed in order to detect a deformation of the fuel cell due to an impact in either one of the laminating direction and the orthogonal direction, it may be assumed to use, as the pressure loss parameter value, only a pressure loss parameter value corresponding to an impact in the other one of the laminating direction and the orthogonal direction.

Further, in step S150 (FIG. 11) and step S190 in the third embodiment, occurrence of a deformation of the fuel cell 15 may be determined just by comparing the change amount of the first pressure loss parameter value and the change amount of the second pressure loss parameter value with their corresponding reference values without determining the direction of the impact received by the fuel cell 15 depending on the type of the pressure loss parameter value that exceeds its reference value. Even when the direction of the impact is not specified, it is possible to detect a deformation of the fuel cell 15 with high accuracy even at the time when the impact is applied in either direction, with the use of the first pressure loss parameter value changing in response to the impact in the laminating direction and the second pressure loss parameter value changing in response to the impact in the orthogonal direction.

The disclosure is not limited to the above embodiments and is achievable with various configurations within a range that does not deviate from the gist of the disclosure. For example, the technical features of the embodiments corresponding to the technical features of each aspect described in SUMMARY can be replaced or combined appropriately, in order to resolve some or all of the problems described above or in order to achieve some or all of the above effects. Further, the technical features can be deleted appropriately if the technical features have not been described as essential in the present specification.

What is claimed is:

1. An inspection method for inspecting occurrence of a deformation in a fuel cell formed by laminating a plurality of single cells and including a gas passage through which a reactant gas flows and a refrigerant passage through which a refrigerant flows, the gas passage and the refrigerant passage being each provided inside the fuel cell as a fluid passage through which a fluid flows in parallel to a lamination plane of the fuel cell, the inspection method comprising:
   acquiring a pressure loss parameter value before an impact is applied to the fuel cell and a pressure loss parameter value after the impact is applied to the fuel cell, as a pressure loss parameter value correlated with a pressure loss in the fluid passage provided inside the fuel cell, the pressure loss parameter value being obtained when the fluid at a flow rate determined in advance is introduced into the fluid passage;
   finding a change amount between the acquired pressure loss parameter value before the impact and the acquired pressure loss parameter value after the impact; and
   determining that the deformation has occurred inside the fuel cell, when the change amount indicative of an increase of the pressure loss is a reference value determined in advance or more, wherein it is determined that the deformation has occurred inside the fuel cell due to the impact, in at least either of following cases:
   a case where the change amount of a first pressure loss parameter value that is a pressure loss parameter value in the gas passage is a first reference value or more; and
   a case where the change amount of a second pressure loss parameter value that is a pressure loss parameter value in the refrigerant passage is a second reference value or more;
   wherein:
   when the change amount of the first pressure loss parameter value is the first reference value or more, it is determined that the deformation has occurred due to an impact in a laminating direction of the single cells; and
   when the change amount of the second pressure loss parameter value is the second reference value or more, it is determined that the deformation has occurred inside the fuel cell due to an impact in an orthogonal direction that is orthogonal to the laminating direction.

2. The inspection method according to claim 1, further comprising acquiring a direction of the impact after the impact is applied to the fuel cell, wherein:
   in a case where the direction of the impact is the laminating direction, it is determined whether or not the change amount of the first pressure loss parameter value is the first reference value or more; and
   in a case where the direction of the impact is the orthogonal direction, it is determined whether or not the change amount of the second pressure loss parameter value is the second reference value or more.

3. The inspection method according to claim 1, wherein:
   when the change amount of the first pressure loss parameter value is the first reference value or more, it is determined that the deformation has occurred due to an impact in a laminating direction of the single cells; or
   when the change amount of the second pressure loss parameter value is the second reference value or more, it is determined that the deformation has occurred due to an impact in an orthogonal direction that is orthogonal to the laminating direction.

4. The inspection method according to claim 1, wherein:
a fuel gas supply device configured to adjust a flow rate of a fuel gas to be supplied to the fuel cell and including an injector and a fuel gas pump is connected to the fuel cell, the injector being configured to discharge the fuel gas into a fuel gas supply passage through which the fuel gas is supplied to the fuel cell and to adjust an amount of the fuel gas to be supplied to the fuel gas supply passage based on a valve-opening duty ratio of the injector, the fuel gas pump being provided in a circulation passage through which a fuel exhaust gas discharged from the fuel cell is recirculated to the fuel gas supply passage; and
the first pressure loss parameter value includes at least any one of the following values:
a value of an electric power used by the fuel gas pump when the flow rate of the fuel gas in a fuel-gas passage formed in the fuel cell becomes a first flow rate determined in advance at a time when driving amounts of devices included in the fuel gas supply device, except the fuel gas pump, are constant;
a value of the valve-opening duty ratio of the injector when the flow rate of the fuel gas in the fuel-gas passage formed in the fuel cell becomes a second flow rate determined in advance at a time when driving amounts of devices included in the fuel gas supply device, except the injector, are constant; and
a value of the flow rate of the fuel gas actually flowing through the fuel-gas passage formed in the fuel cell when the fuel gas supply device including the fuel gas pump and the injector is driven at a command value determined in advance so that the flow rate of the fuel gas in the fuel-gas passage becomes a third flow rate determined in advance.

5. The inspection method according to claim 1, wherein:
an oxidation gas supply device configured to adjust a flow rate of an oxidation gas to be supplied to the fuel cell and including a compressor and a control valve is connected to the fuel cell, the compressor being configured to discharge the oxidation gas into an oxidation gas supply passage through which the oxidation gas is supplied to the fuel cell, the control valve being configured to adjust a flow passage area of an oxidation gas discharge passage through which an oxidation exhaust gas discharged from the fuel cell flows; and
the first pressure loss parameter value includes at least any one of the following values:
a value of an electric power used by the compressor when the flow rate of the oxidation gas in an oxidation-gas passage formed in the fuel cell becomes a fourth flow rate determined in advance at a time when driving amounts of devices included in the oxidation gas supply device, except the compressor, are constant;
a value of an opening degree of the control valve when the flow rate of the oxidation gas in the oxidation-gas passage formed in the fuel cell becomes a fifth flow rate determined in advance at a time when driving amounts of devices included in the oxidation gas supply device, except the control valve, are constant; and
a value of the flow rate of the oxidation gas actually flowing through the oxidation-gas passage formed in the fuel cell when the oxidation gas supply device including the compressor and the control valve is driven at a command value determined in advance so that the flow rate of the oxidation gas in the oxidation-gas passage becomes a sixth flow rate determined in advance.

6. The inspection method according to claim 1, wherein:
a refrigerant supply device configured to adjust a flow rate of a refrigerant to be supplied to the refrigerant passage formed in the fuel cell and including a refrigerant pump is connected to the fuel cell, the refrigerant pump being configured to generate a driving force to cause the refrigerant to flow through the refrigerant passage; and
the second pressure loss parameter value includes at least either one of the following values:
a value of an electric power used by the refrigerant pump when the flow rate of the refrigerant in the refrigerant passage formed in the fuel cell becomes a seventh flow rate determined in advance at a time when driving amounts of devices included in the refrigerant supply device, except the refrigerant pump, are constant; and
a value of the flow rate of the refrigerant actually flowing through the refrigerant passage formed in the fuel cell when the refrigerant supply device including the refrigerant pump is driven at a command value determined in advance so that the flow rate of the refrigerant in the refrigerant passage becomes an eighth flow rate determined in advance.

7. An inspection system for inspecting occurrence of a deformation in a fuel cell formed by laminating a plurality of single cells and including a gas passage through which a reactant gas flows and a refrigerant passage through which a refrigerant flows, the gas passage and the refrigerant passage being each provided inside the fuel cell as a fluid passage through which a fluid flows in parallel to a lamination plane, the inspection system comprising:
a storage portion configured to store a pressure loss parameter value before an impact is applied to the fuel cell, as a pressure loss parameter value correlated with a pressure loss in the fluid passage provided inside the fuel cell, the pressure loss parameter value being obtained when the fluid at a flow rate determined in advance is introduced into the fluid passage;
a detecting portion configured to detect, after the impact is applied to the fuel cell, the pressure loss parameter value obtained when the fluid at the flow rate determined in advance is introduced into the fluid passage;
a derivation portion configured to derive a change amount between the pressure loss parameter value before the impact, stored in the storage portion, and the pressure loss parameter value after the impact, detected by the detecting portion; and
a determination portion configured to determine that the deformation has occurred inside the fuel cell, when the change amount indicative of an increase of the pressure loss is a reference value determined in advance or more, wherein the determination portion is configured to determine that the deformation has occurred inside the fuel cell, in at least either of following cases:
a case where the change amount of a first pressure loss parameter value that is a pressure loss parameter value in the gas passage is a first reference value or more; and
a case where the change amount of a second pressure loss parameter value that is a pressure loss parameter value in the refrigerant passage is a second reference value or more;
wherein:
when the change amount of the first pressure loss parameter value is the first reference value or more, the determination portion is configured to determine that the deformation has occurred due to an impact in a laminating direction of the single cells; and when the change amount of the second pressure loss parameter value is the second reference value or more, the determination portion is configured to determine that the deformation has occurred inside the fuel cell due to an impact in an orthogonal direction that is orthogonal to the laminating direction.

\* \* \* \* \*